US011212686B2

United States Patent
Yoon et al.

(10) Patent No.: US 11,212,686 B2
(45) Date of Patent: *Dec. 28, 2021

(54) METHOD AND DEVICE FOR PERFORMING RADIO LINK MONITORING BY USER EQUIPMENT IN WIRELESS COMMUNICATION SYSTEM

(71) Applicant: LG ELECTRONICS INC., Seoul (KR)

(72) Inventors: Sukhyon Yoon, Seoul (KR); Kijun Kim, Seoul (KR); Eunsun Kim, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 98 days.

This patent is subject to a terminal disclaimer.

(21) Appl. No.: 16/718,030

(22) Filed: Dec. 17, 2019

(65) Prior Publication Data

US 2020/0128417 A1 Apr. 23, 2020

Related U.S. Application Data

(63) Continuation of application No. 16/065,117, filed as application No. PCT/KR2018/001585 on Feb. 6, 2018, now Pat. No. 10,542,445.

(Continued)

(51) Int. Cl.
*H04W 24/08* (2009.01)
*H04W 72/04* (2009.01)
*H04W 56/00* (2009.01)
*H04W 24/10* (2009.01)

(52) U.S. Cl.
CPC ........... *H04W 24/08* (2013.01); *H04W 24/10* (2013.01); *H04W 56/001* (2013.01); *H04W 72/042* (2013.01)

(58) Field of Classification Search
CPC ... H04W 24/08; H04W 24/10; H04W 72/042; H04W 56/001; H04W 76/19; H04W 16/28; H04L 5/005; H04L 5/0023; H04L 5/0057
See application file for complete search history.

(56) References Cited

U.S. PATENT DOCUMENTS 9,107,084 B2 8/2015 Siomina et al.
10,542,445 B2 1/2020 Yoon et al.
(Continued)

FOREIGN PATENT DOCUMENTS

KR 1020150041007 4/2015
WO 2016163843 10/2016
WO 2017014600 1/2017

OTHER PUBLICATIONS

Intellectual Property Office of India Application Serial No. 201927018087, Office Action dated Oct. 29, 2020, 14 pages.

(Continued)

*Primary Examiner* — Walli Z Butt
(74) *Attorney, Agent, or Firm* — Lee, Hong, Degerman, Kang & Waimey

(57) ABSTRACT

The present invention discloses a method for performing radio link monitoring by a user equipment in a wireless communication system and device for supporting the same. Particularly, the present invention discloses a method for performing radio link monitoring by a user equipment when a base station supports at least one beam and device for supporting the same.

15 Claims, 14 Drawing Sheets

Related U.S. Application Data

(60) Provisional application No. 62/587,344, filed on Nov. 16, 2017, provisional application No. 62/564,242, filed on Sep. 27, 2017, provisional application No. 62/542,305, filed on Aug. 8, 2017, provisional application No. 62/525,122, filed on Jun. 26, 2017, provisional application No. 62/520,525, filed on Jun. 15, 2017, provisional application No. 62/488,859, filed on Apr. 24, 2017, provisional application No. 62/455,499, filed on Feb. 6, 2017.

(56) References Cited

U.S. PATENT DOCUMENTS

| | | |
|---|---|---|
| 2013/0039268 A1 | 2/2013 | Blankenship et al. |
| 2013/0286960 A1 | 10/2013 | Li et al. |
| 2014/0269368 A1* | 9/2014 | Xu .................. H04L 5/0053 370/252 |
| 2014/0334397 A1 | 11/2014 | Chen et al. |
| 2016/0135187 A1 | 5/2016 | Cui et al. |
| 2016/0337227 A1* | 11/2016 | Palenius ............ H04L 5/0073 |
| 2017/0222771 A1 | 8/2017 | Kannan et al. |
| 2019/0052377 A1* | 2/2019 | Hwang .............. H04B 17/309 |
| 2020/0037186 A1* | 1/2020 | Thangarasa .......... H04W 24/10 |

OTHER PUBLICATIONS

Samsung, "Usage of RS for radio link monitoring in connected," 3GPP TSG RAN WG1#89, R1-1707936, May 2017, 3 pages.

LG Electronics Inc., "RLM and RLF," 3GPP TSG-RAN Meeting #97, R2-1701968, Athens, Greece, Feb. 13-17, 2017, 2 pages.

Xinwei, "Discussion on RS Design and QCL Related Issues," 3GPP TSG-RAN WG1 #87, R1-1612257, Reno, Nevada, Nov. 14-18, 2016, 6 pages.

PCT International Application No. PCT/KR2018/001585, Notification of Transmittal of the International Search Report and the Written Opinion of the International Searching Authority, or Declaration dated May 15, 2018, 22 pages.

Nokia, et al., "SS Bandwidth, Numerology and Multiplexing", 3GPP TSG RAN WG1 NR Ad-Hoc Meeting, R1-1701056, Jan. 2017, 8 pages.

LG Electronics, "Discussion on QCL for NR", 3GPP TSG RAN WG1 NR Ad-Hoc Meeting, R1-1700487, Jan. 2017, 3 pages.

Huawei, et al., "Analysis and evaluation on RS configuration for RRM measurement of Connected and Idle UEs", 3GPP TSG RAN WG1 NR Ad-Hoc Meeting, R1-1700403, Jan. 2017, 7 pages.

LG Electronics, "Discussion on RRM measurement in NR", 3GPP TSG RAN WG1 NR Ad-Hoc Meeting, R1-1700466, Jan. 2017, 5 pages.

Mediatek, "RLM and RLF in HF NR", 3GPP TSG RAN WG2 NR, R2-1700246, Jan. 2017, 5 pages.

Samsung, "Radio Link Monitoring in mmW systems", 3GPP TSG RAN WG2 Meeting #97bis, R2-1703290, Apr. 2017, 3 pages.

Lenovo, et al., "Discussion of RS for DL beam management", 3GPP TSG RAN WG1 R Ad-Hoc #2, R1-1710595, Jun. 2017, 3 pages.

U.S. Appl. No. 16/065,117, Notice of Allowance dated Sep. 18, 2019, 12 pages.

* cited by examiner

METHOD AND DEVICE FOR PERFORMING RADIO LINK MONITORING BY USER EQUIPMENT IN WIRELESS COMMUNICATION SYSTEM

CROSS-REFERENCE TO RELATED APPLICATION(S)

This application is a continuation of U.S. patent application Ser. No. 16/065,117, filed on Jun. 21, 2018, currently pending, which is the National Stage filing under 35 U.S.C. 371 of International Application No. PCT/KR2018/001585, filed on Feb. 6, 2018, which claims the benefit of U.S. Provisional Application No. 62/455,499, filed on Feb. 6, 2017, 62/488,859, filed on Apr. 24, 2017, 62/520,525, filed on Jun. 15, 2017, 62/525,122, filed on Jun. 26, 2017, 62/542,305, filed on Aug. 8, 2017, 62/564,242, filed on Sep. 27, 2017, and 62/587,344, filed on Nov. 16, 2017, the contents of which are all hereby incorporated by reference herein in their entirety.

TECHNICAL FIELD

The present invention relates to a wireless communication system, and more particularly, to a method for performing radio link monitoring by a user equipment in a wireless communication system and device for supporting the same.

Specifically, the invention is directed to a method for performing radio link monitoring by a user equipment in a wireless communication system capable of supporting at least one beam and device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

An object of the present invention is to provide a method for performing radio link monitoring by a user equipment in a newly proposed communication system and device therefor.

Another object of the present invention is to provide a reference signal used by a user equipment to perform radio link monitoring in a wireless communication system supporting transmission of at least one beam and radio link monitoring method using the reference signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention provides a method for performing radio link monitoring by a user equipment in a wireless communication system and devices therefor.

In an aspect of the present invention, provided herein is a method for performing radio link monitoring (RLM) by a user equipment (UE) in a wireless communication system, including: receiving, on at least one resource, at least one of a synchronization signal/physical broadcast channel (SS/PBCH) block and a channel state information reference signal (CSI-RS), each of which corresponds to the at least one resource, wherein the SS/PBCH block includes a primary synchronization signal (PSS), a secondary synchronization signal (SSS) and a physical broadcast channel (PBCH); assessing radio link quality using at least one of the received SS/PBCH block and CSI-RS; and transmitting radio link state information based on the assessed radio link quality to a higher layer.

In another aspect of the present invention, provided herein is a user equipment (UE) for performing radio link monitoring (RLM) in a wireless communication system, including: a receiver; and a processor connected to the receiver, wherein the processor is configured to: receive, on at least one resource, at least one of a synchronization signal/physical broadcast channel (SS/PBCH) block and a channel state information reference signal (CSI-RS), each of which corresponds to the at least one resource, wherein the SS/PBCH block includes a primary synchronization signal (PSS), a secondary synchronization signal (SSS) and a physical broadcast channel (PBCH); assess radio link quality using at least one of the received SS/PBCH block and CSI-RS; and transmit radio link state information based on the assessed radio link quality to a higher layer.

In this case, the resource may correspond to a beam.

In addition, the CSI-RS corresponding to the at least one resource may be configured to have the same characteristics as those of the CSI-RS for beam management (BM) corresponding to the at least one resource.

At this time, if the radio link quality is assessed using the CSI-RS corresponding to the at least one resource, the UE may assess the radio link quality using characteristic information of the CSI-RS for the BM corresponding to the at least one resource.

Moreover, a block error rate (BLER) for a hypothetical physical downlink control channel (PDCCH) may be used as a metric for assessing the radio link quality.

At this time, if the radio link quality of every at least one resource is less than a threshold, the UE may transmit the radio link state information set to 'Out-of-Sync' to the higher layer.

Further, if the received SS/PBCH block and CSI-RS have different transmission power, the assessment of the radio link quality may be performed by considering a transmission power difference between the received SS/PBCH block and CSI-RS.

Additionally, the UE may receive information on a correlation relationship between the SS/PBCH block and CSI-RS per resource.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, when a base station is able to support at least one beam, a UE may perform radio link monitoring by considering the at least one beam.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR INVENTION

Figure 1:
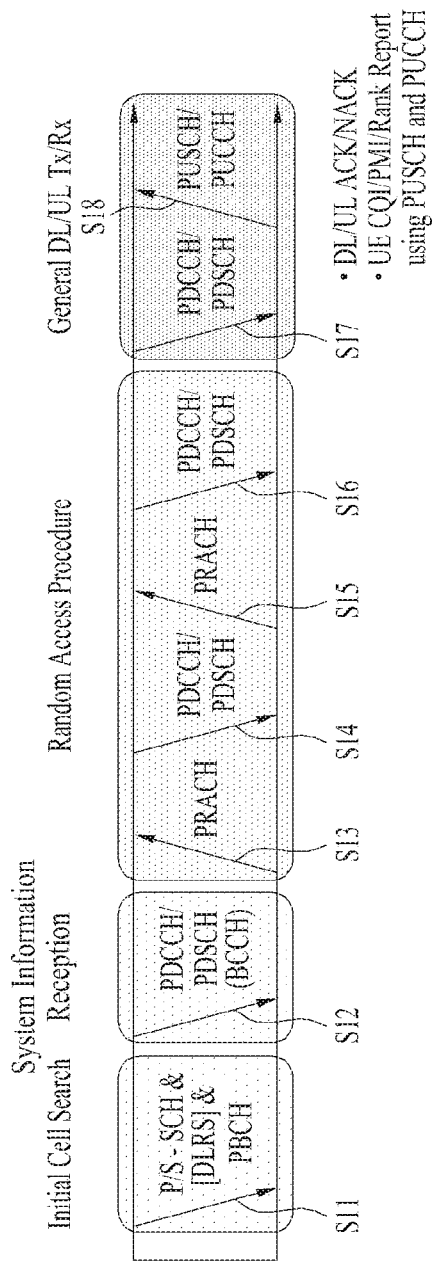
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
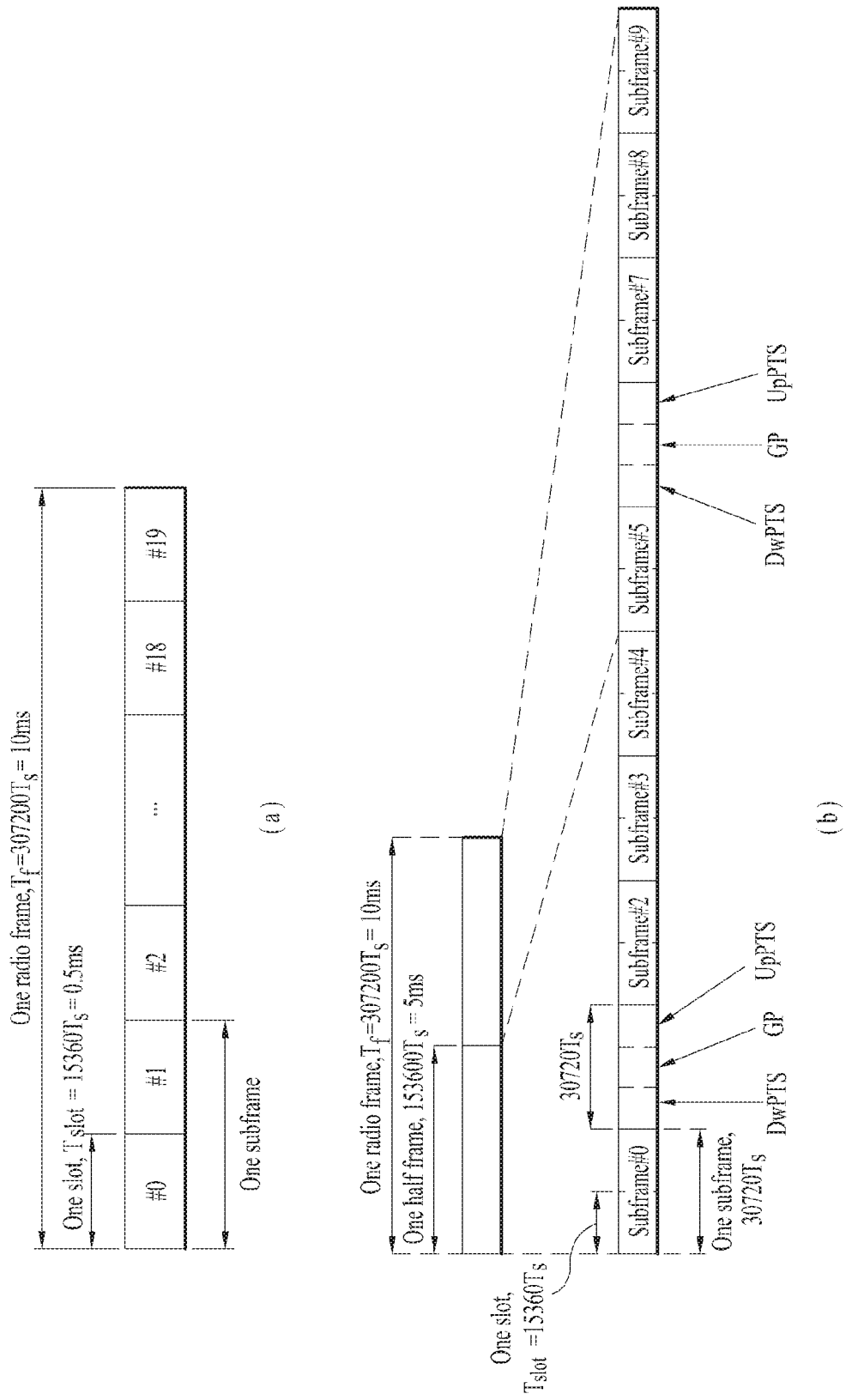
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cylic prefic in downlink | | Extended cylic prefic in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
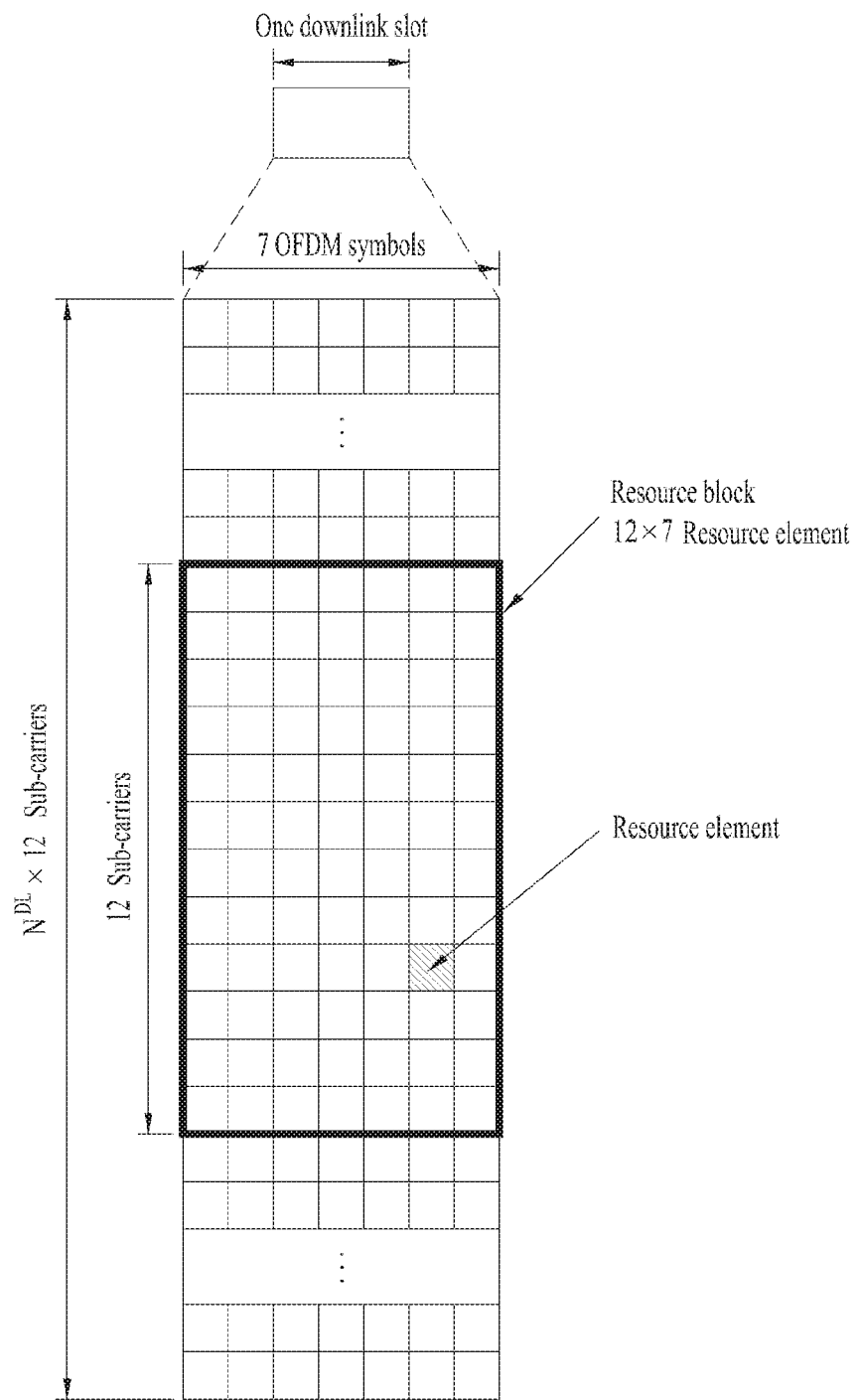
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
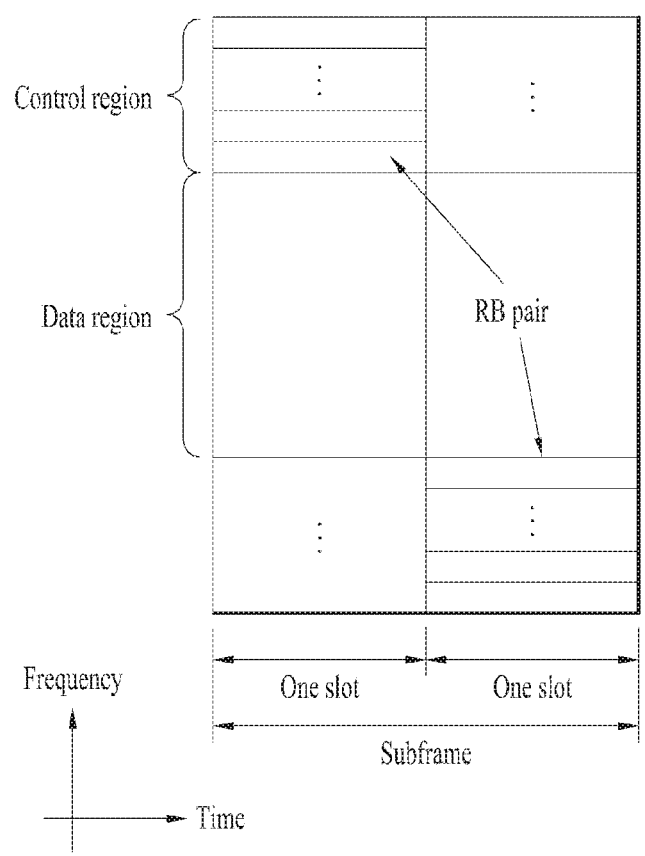
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
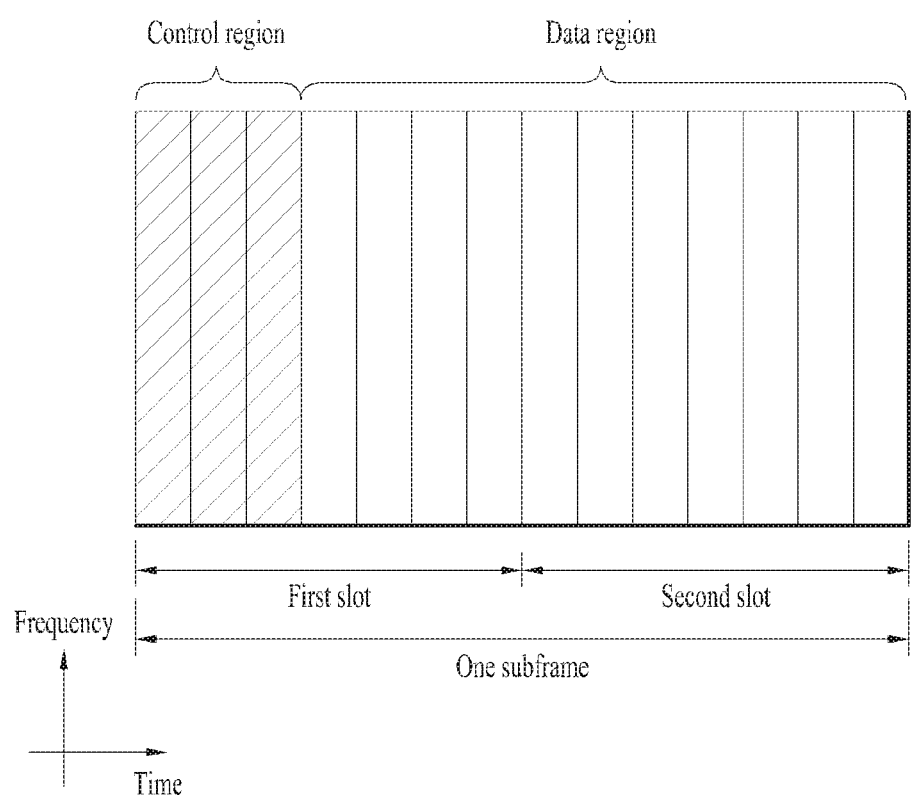
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, a user equipment (UE) is defined to report channel state information (CSI) to a base station (BS) (or eNB). Herein, the CSI collectively refers to information indicating the quality of a radio channel (link) established between a UE and an antenna port.

For example, the CSI may include a rank indicator (RI), a precoding matrix indicator (PMI), and a channel quality indicator (CQI).

Herein, the RI, which indicates rank information about a channel, represents the number of streams that a UE receives through the same time-frequency resources. The RI value is determined depending on long-term fading of the channel and is thus usually fed back to the BS by the UE with a longer period than that for the PMI and CQI.

The PMI, which is a value reflecting the channel space characteristics, indicates a precoding index preferred by the UE based on a metric such as the SINR.

The CQI, which is a value indicating the intensity of a channel, typically indicates a reception SINR which may be obtained by the BS when the PMI is used.

In the 3GPP LTE or LTE-A system, the BS configures a plurality of CSI processes for the UE and receive CSI for each process from the UE. In this case, the CSI process is configured with a CSI-RS for measuring the quality of the signal from the BS and CSI interference measurement (CSI-IM) resources.

1.4. RRM Measurement

The LTE system supports radio resource management (RRM) operation including power control, scheduling, cell search, cell reselection, handover, radio link or connection monitoring, and connection establishment and re-establishment. In this case, the serving cell may request the UE to send RRM measurement information corresponding to the measurement value for performing the RRM operation. As representative examples, in the LTE system, the UE may measure cell search information, reference signal received power (RSRP), reference signal received quality (RSRQ), and the like for each cell and then transmit the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the call-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, the UE operating in the LTE system may measure the RSRP in the bandwidth indicated by the allowed measurement bandwidth related information element (IE) transmitted in system information block type 3 (SIB3). Meanwhile, in the case of inter-frequency measurement, the UE may measure the RSRP in the bandwidth corresponding to one of 6, 15, 25, 50, 75, 100 resource blocks (RBs) indicated by the allowed measurement bandwidth related IE transmitted in SIB5. Alternatively, when there is no IE, the UE may measure the RSRP in the entire downlink system frequency band as the default operation.

Upon receiving information on the allowed measurement bandwidth, the UE may consider the corresponding value as the maximum measurement bandwidth and then freely measure the RSRP value in the corresponding value. However, if the service cell transmits an IE defined as WB-RSRQ to the UE and set the allowed measurement bandwidth equal to or higher than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

1.5. RLM (Radio Link Monitoring)

Figure 6:
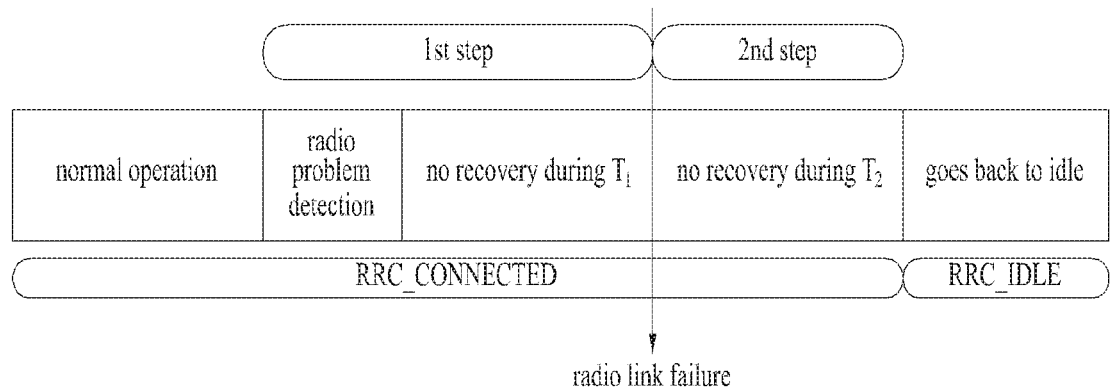
FIG. 6 is a flowchart illustrating a method for detecting radio link failure.

FIG. 6 is a flowchart illustrating a method for detecting radio link failure.

In the carrier aggregation system having multiple serving cells, a UE performs radio link monitoring (RLM) for the serving cells.

In the case of RLM, the UE may monitor the downlink link quality of a serving cell (e.g., primary cell (Pcell)) based on a CRS. For example, the UE may measure the radio link quality in a single subframe based on the CRS and then monitor/evaluate the radio link state (e.g., OUT-OF-SYNC or IN-SYNC) by comparing the estimated value (e.g., SNR (Signal to Noise Ratio) or SINR (Signal to Interference and Noise Ratio)) with a threshold value (i.e., Qout or Qin). If the radio link state is IN-SYNC, the UE may normally perform/maintain communication with the BS, and if the radio link state is OUT-OF-SYNC, the UE may consider that radio link has failed and perform an operation such as RRC connection re-establishment, handover, cell reselection and cell measurement. The threshold value Qout is defined as the level where a downlink radio link cannot be received reliably and corresponds to 10% BLER (Block Error Rate) of hypothetical PDCCH transmission when PCFICH errors are considered by assuming the parameters of Table 2. The threshold value Qin is defined as the level where a downlink radio link can be received meaningfully and reliably and corresponds to 2% PDCCH BLER of hypothetical PDCCH transmission when PCFICH errors are considered by assuming the parameters of Table 3. In this case, a subframe(s) where RLM is performed may be restricted through higher layer (e.g., RRC) signaling.

Table 2 illustrates PDCCH/PCFICH transmission parameters for OUT-OF-SYNC, and Table 2 illustrates PDCCH/PCFICH transmission parameters for IN-SYNC.

quality is evaluated. In the non-DRX mode, the physical layer of the UE evaluates the radio link quality every radio frame, and in the DRX mode, the physical layer of the UE evaluates the radio link quality at least once every DRX cycle. If higher layer signalling indicates subframe(s) for restricted radio link monitoring (RLM), the radio link quality is not evaluated at other subframes except those indicated. Thereafter, when the radio link quality is worse than the threshold Qout, the physical layer of the UE informs the higher layer of OUT-OF-SYNC at the radio frames where the radio link quality is evaluated.

When the radio link state indicates IN-SYNC, the UE may normally perform/maintain communication with the BS. When the radio link state indicates OUT-OF-SYNC, the UE considers that radio link failure (RLF) has occurred in the radio link. If radio link failure (RLF) occurs in the PCell, the UE starts the process shown in FIG. 6. Referring to FIG. 6, the RLF-related operation may be divided into two steps.

The first step starts when a radio link problem is detected. This leads to radio link failure detection. There is no UE-based mobility in the first step, and the first step is based on timer T1.

TABLE 2

| Attribute | Value |
| --- | --- |
| DCI format | 1A |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregaten level (CCE) | 4; Bandwidth = 1.4 MHz<br>8; Bandwidth ≥ 3 MHz |
| Ratio of PDCCH RE energy to average RS RE energy | 4 dB; when single antenna port is used for cell-specific reference signal transmission by the PCell.<br>1 dB; when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB; when two or four antenna ports are used for cell-specific reference signal transmission by the PCell. |

Note 1:
DCI format 1A is defined in clause 5.3.3.1.3 in TS 36.212 [21].
Note 2:
A hypothetical PCFICH transmission corresponding to the number of control symbols shall be assumed.

TABLE 3

| Attribute | Value |
| --- | --- |
| DCI format | 1C |
| Number of control OFDM symbols | 2; Bandwidth ≥ 10 MHz<br>3; 3 MHz ≤ Bandwidth ≤ 10 MHz<br>4; Bandwidth: = 1.4 MHz |
| Aggregation level (CCE) | 4 |
| Ratio of PDCCH RE energy to average RS RE energy | 0 dB; when single antenna port is used for cell-specific reference signal transmission by the PCell.<br>−3 dB; when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB: when two or four antenna ports are used for cell-specific reference signal transmission by the PCell. |

Note 1:
DCI format 1C is defined in clause 5.3.3.1.4 to TS 36.212 [21].
Note 2:
A hypothetical PCFICH transmission corresponding to the number of control symbols shall be assumed.

A physical layer of the UE monitors the downlink radio link quality of a serving cell (e.g., PCell) and informs a higher layer (e.g., RRC layer) of OUT-OF-SYNC/IN-SYNC states. Specifically, if the radio link quality is better than Qin, the physical layer of the UE informs the higher layer of the IN-SYNC state at the radio frame where the radio link The second step starts when radio link failure has been detected but handover has failed. This leads to the RRC_IDLE state. There is UE-based mobility in the second step, and the second step is based on timer T2.

In the second step, the UE resumes an RRC connection (state), and in order to avoid entering to the RRC_IDLE state, the UE may perform the following processes when returning to the same cell where radio link failure is found, when the BS selects another cell different from the cell where radio link failure is found, or when another BS selects a cell.

1. The UE maintains the RRC_CONNECTED state for a time period of T2.
2. The UE accesses to a cell through the random access procedure.
3. The BS identifies the corresponding UE using the identification information or identifier of the UE (e.g., C-RNTI of the UE in the cell where RLF occurs, ID of the physical layer of the corresponding cell, short MAC-I based on the security key of the corresponding cell, etc.), which is used in the contention resolution random access procedure, and confirms whether the stored context belongs to the UE. At this time, the identification information of the UE, which is used in the contention resolution random access procedure, may be the information used for random access preamble transmission of the contention resolution random access procedure.

In process 3, if the BS detects that the stored context is the same as the ID of the corresponding UE, the BS informs the UE that the UE's RRC connection may restart. Meanwhile, if the base station does not find the context, the RRC connection between the UE and BS is released, and the UE may start a procedure for establishing a new RRC connection. In this case, the UE enters the RRC IDLE state.

In summary, in the LTE system, the PDCCH/PCFICH are defined as reference channels for RLM, and the communication quality threshold is also defined to determine IN-SYNC/OUT-OF-SYNC states based on the defined reference channels. In this case, since the reference channel, PDCCH is not always transmitted, the UE expects the channel quality of the PDCCH based on the SNR in the region where the PDCCH is transmitted and compares the expected channel quality with the threshold in order to perform RLM.

2. New Radio Access Technology System

As a number of communication devices have required higher communication capacity, the necessity for the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

The new radio access technology system has been proposed by considering the enhanced mobile broadband communication, massive MTC, Ultra-reliable and low latency communication (URLLC), etc. In the present invention, the corresponding technology is referred to as the new RAT or new radio (NR) for convenience of description.

2.1. Numerologies

The NR system to which the present invention is applicable supports various OFDM numerologies as shown in the following table. In this case, the value of μ and cyclic prefix information per carrier bandwidth part may be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 4

| μ | Δf = $2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

2.2 Frame Structure

For DL and UL transmission, a frame may be configured to have a length of 10 ms. Each frame may be composed of ten subframes, each having a length of 1 ms. In this case, the number of consecutive OFDM symbols in each subframe is defined as follows: $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe, \mu}-1\}$ and may also be numbered within a frame in ascending order like $n_{s,f}^\mu \in \{0, \ldots, N_{slot}^{frame, \mu}-1\}$. In this case, the number of consecutive OFDM symbols in one slot ($N_{symb}^{slot}$) may be determined based on the cyclic prefix as shown in the following table. The start slot ($n_s^\mu$) of one subframe is aligned with the start OFDM symbol ($n_s^\mu N_{symb}^{slot}$) of the same subframe in the time dimension. Table 5 shows the number of OFDM symbols in each slot/frame/subframe in the case of the normal cyclic prefix, and Table 6 shows the number of OFDM symbols in each slot/frame/subframe in the case of the extended cyclic prefix.

TABLE 5

| μ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 6

| μ | $N_{symb}^{slot}$ | $N_{slot}^{frame, \mu}$ | $N_{slot}^{subframe, \mu}$ |
| --- | --- | --- | --- |
| 2 | 12 | 40 | 4 |

In the NR system to which the present invention is applicable, a self-contained slot structure may be applied based on the above-described slot structure.

Figure 7:
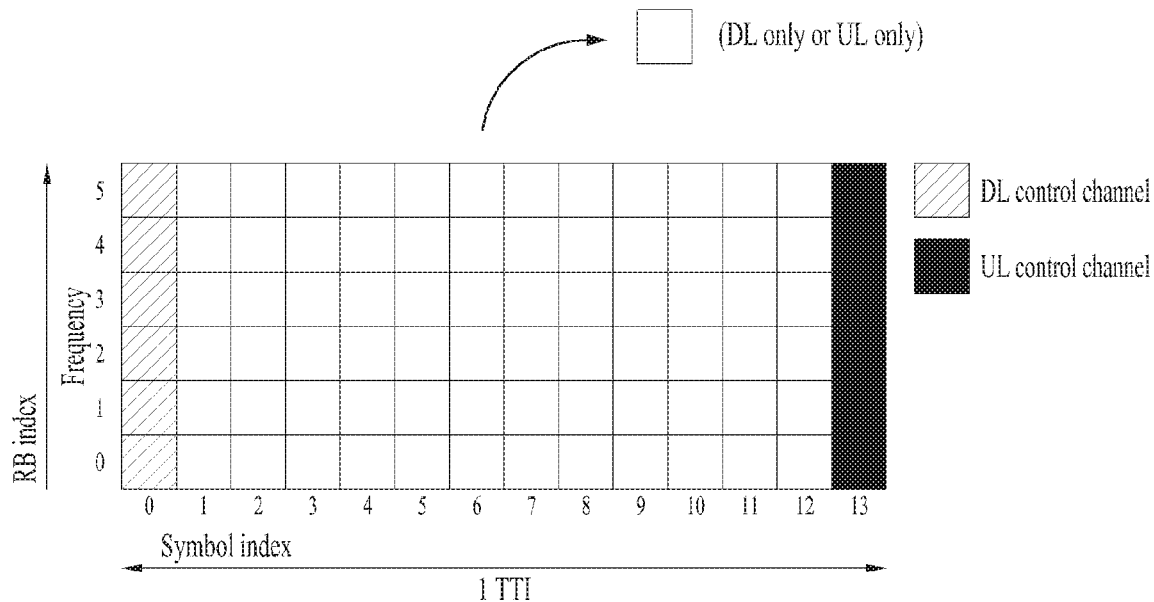
FIG. 7 is a diagram illustrating a self-contained subframe structure applicable to the present invention.

FIG. 7 illustrates a self-contained slot structure applicable to the present invention.

In FIG. 7, the hatched area (e.g., symbol index=0) indicates a downlink control region, and the black area (e.g., symbol index=13) indicates an uplink control region. The remaining area (e.g., symbol index=1 to 13) may be used for DL or UL data transmission.

Based on this structure, the BS and UE can sequentially perform DL transmission and UL transmission in one slot. That is, the BS and UE may transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required to allow the BS and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions may be selectively included in the self-contained slot structure. In other words, the self-contained slot structure according to the present invention may include either the DL control region or the UL control region as well as both the DL and UL control regions as shown in FIG. 7.

In addition, for example, the slot may have various slot formats. In this case, OFDM symbols in each slot may be divided into downlink symbols (denoted by 'D'), flexible symbols (denoted by 'X'), and uplink symbols (denoted by 'U').

Thus, the UE may assume that DL transmission occurs only in symbols denoted by 'D' and 'X' in the DL slot. Similarly, the UE may assume that UL transmission occurs only in symbols denoted by 'U' and 'X' in the UL slot.

2.3. Analog Beamforming

In a millimeter wave (mmW) system, since a wavelength is short, a number of antenna elements can be installed in the same unit area. That is, assuming that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element may include a transceiver unit (TXRU) to enable adjustment of transmission power and phase in each antenna element. By doing so, independent beamforming can be performed per frequency resource in each antenna element.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 8:
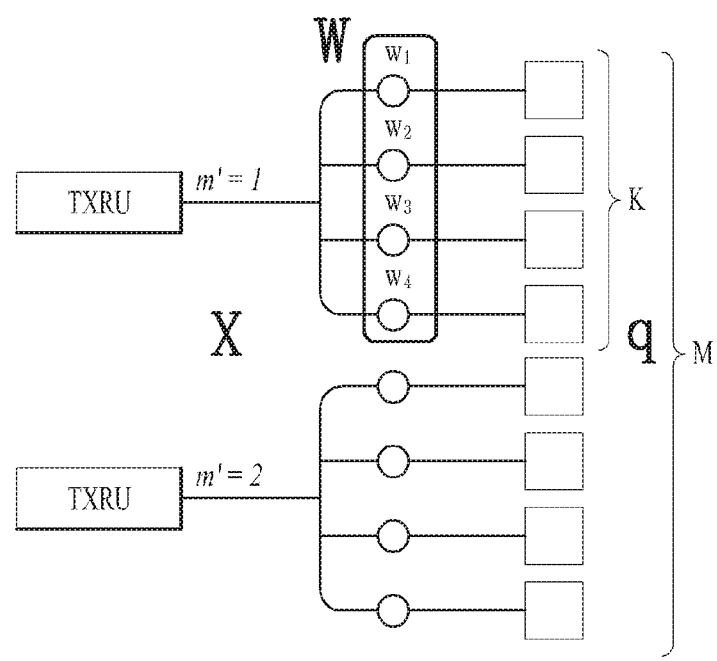
FIGS. 8 and 9 are diagrams illustrating representative methods for connecting TXRUs to antenna elements.
Figure 9:
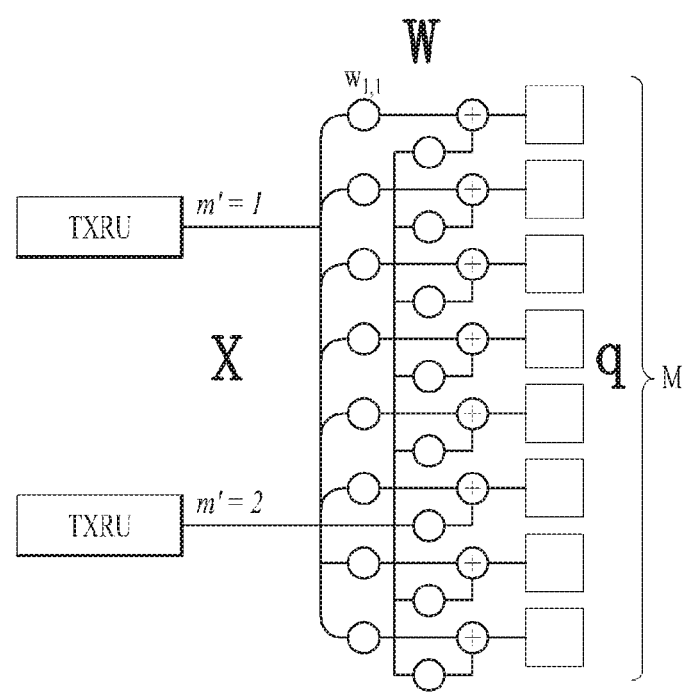

FIGS. 8 and 9 are diagrams illustrating representative methods for connecting TXRUs to antenna elements. Here, the TXRU virtualization model represents the relationship between TXRU output signals and antenna element output signals.

FIG. 8 shows a method for connecting TXRUs to sub-arrays. In FIG. 8, one antenna element is connected to one TXRU.

Meanwhile, FIG. 9 shows a method for connecting all TXRUs to all antenna elements. In FIG. 9, all antenna element are connected to all TXRUs. In this case, separate addition units are required to connect all antenna elements to all TXRUs as shown in FIG. 8.

In FIGS. 8 and 9, W indicates a phase vector weighted by an analog phase shifter. That is, W is a major parameter for determining the analog beamforming direction. In this case, the mapping relationship between CSI-RS antenna ports and TXRUs may be 1:1 or 1-to-many.

According to the configuration shown in FIG. 8, it is difficult to achieve beamforming focusing but all antennas may be installed at low cost.

On the contrary, according to the configuration shown in FIG. 9, beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 10:
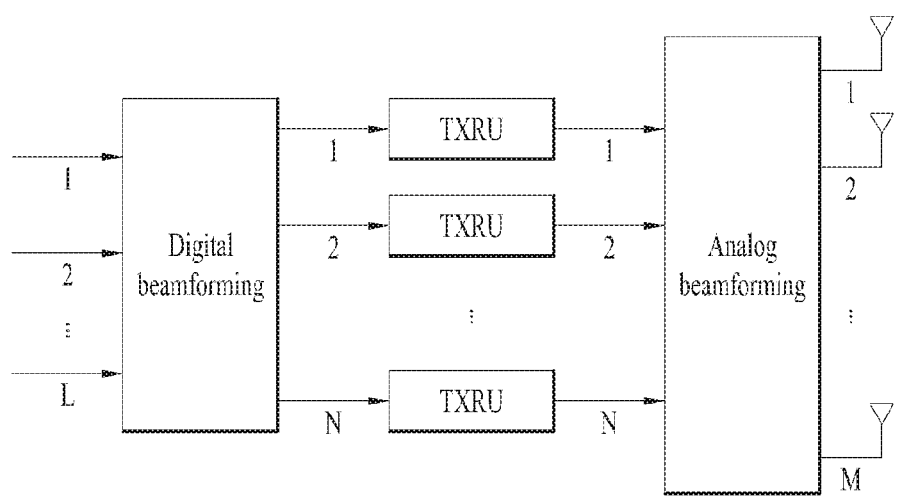
FIG. 10 is a schematic diagram illustrating a hybrid beamforming structure according to an embodiment of the present invention from the perspective of TXRUs and physical antennas.

FIG. 10 is a schematic diagram illustrating a hybrid beamforming structure according to an embodiment of the present invention from the perspective of TXRUs and physical antennas. In FIG. 10, it is assumed that the number of digital beams is L and the number of analog beams is N.

Additionally, a method for providing efficient beamforming to UEs located in a specific area by designing a BS capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the BS uses a plurality of analog beams as described above, each UE has a different analog beam suitable for signal reception. Thus, the beam sweeping operation where the BS applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 11:
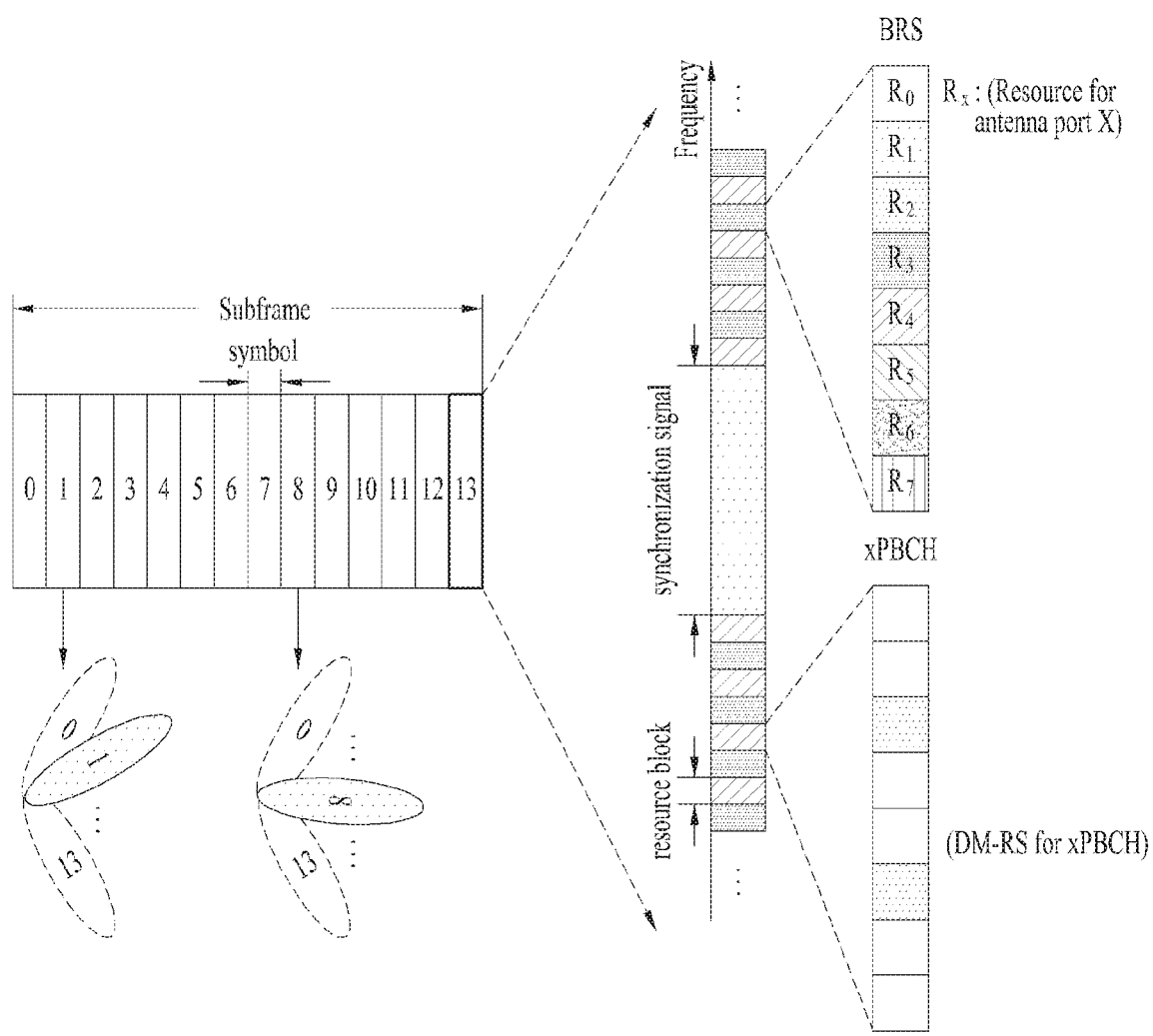
FIG. 11 is a diagram schematically illustrating beam sweeping operation for synchronization signals and system information during a downlink (DL) transmission process according to an embodiment of the present invention.

FIG. 11 is a diagram schematically illustrating the beam sweeping operation for synchronization signals and system information during a downlink (DL) transmission process according to an embodiment of the present invention In FIG. 11, a physical resource (or channel) for transmitting system information of the NR system to which the present invention is applicable in a broadcasting manner is referred to as a physical broadcast channel (xPBCH). In this case, analog beams belonging to different antenna panels may be simultaneously transmitted in one symbol.

In addition, as shown in FIG. 11, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS may be defined for a plurality of antenna ports, and each BRS antenna port may correspond to a single analog beam. In this case, unlike the BRS, all analog beams in an analog beam group may be applied to the synchronization signal or xPBCH to assist a random UE to correctly receive the synchronization signal or xPBCH.

2.4 Synchronization Signal Block

In the NR system to which the present invention is applicable, a primary synchronization signal (PSS) SSS, a secondary synchronization signal (SSS), and/or a physical broadcast channel (PBCH) can be transmitted within one synchronization signal (SS) block. In this case, multiplexing other signals are not precluded within the one SS block.

One SS burst may be composed of one or multiple SS blocks. In this case, the SS blocks included in one SS bust may be consecutive or not, and they may be equal to or different from each other.

One or a plurality of SS bursts may compose one SS burst set.

3. Proposed Embodiment

In the legacy LTE system, if a UE is unable to communicate with a BS due to a certain reason (e.g., degradation of the downlink channel quality of the serving BS, synchronization mismatch between the UE and BS, etc.), the UE may determine that radio link failure occurs and then perform a radio link recovery procedure. In the LTE standards, the radio link failure state is defined as the OUT-OF-SYNC state, and in the present invention, the radio link failure determined by the higher layer may mean that the UE determines that it is currently in the OUT-OF-SYNC state.

In the legacy LTE system, the PDCCH/PCFICH are defined as reference channels for Radio link monitoring (RLM), and the communication quality threshold is also defined to determine IN-SYNC/OUT-OF-SYNC states based on the defined reference channels. In this case, since the reference channel, PDCCH is not always transmitted, the UE expects the channel quality of the PDCCH based on the SNR (signal to noise ratio) in the region where the PDCCH is transmitted and compares the expected channel quality with the threshold in order to perform RLM.

Meanwhile, in the NR system to which the present invention is applicable, the CRS defined in the LTE system (that is, a signal that can be measured at any time when the UE has only basic cell information) is not used. Thus, a channel for determining whether to maintain communication through measurement of communication quality with the serving BS and a metric system for representing the communication quality need to be defined for the NR system to which the present invention is applicable.

Therefore, to solve this problem, the present invention defines a reference signal (or channel) for RLM in the NR system and proposes a metric system for performing RLM using the reference signal.

Reference Signal (or Channel) for RLM

The reference signal for RLM should have the following characteristics.

The reference signal should be broadcasted periodically.

The transmission period should be short enough for fast radio link failure (RLF) recovery.

The reference signal should represent the characteristics of a corresponding reference channel (e.g., PDSCH, PDCCH, etc.).

The resolution of the channel quality measurement should be higher than a certain level (e.g., 1 dB SNR level).

Hereinafter, a method of designing and using a signal with the above characteristics in the NR system to which the present invention is applicable will be described in detail.

In the following description, 'communication quality of beams' may be interpreted to mean the communication quality of the resources configured for RLM. In other words, the two expressions may have the same meaning.

Solution 1. PBCH (or SSS) in SS Block

In the NR system to which the present invention is applicable, a synchronization signal (SS) block may be periodically transmitted to measure reference signal receive power (RSRP) periodically in order to detect a serving BS (multiple beams for one cell) and support mobility. In addition, in the BS system having multiple beams in high frequency band, the SS block may be designed to be transmitted in each antenna beam or antenna beam group, which shall be formed between the BS and UE, for data channels.

Thus, the present invention proposes that if an SS block transmission period is not too long, the UE will perform RLM using the SS block.

In general, the SS block may be composed of the PSS, SSS, and PBCH. In this case, the PSS may mean a signal used for obtaining system timing for SSS reception rather than a signal per BS, and it may be defined as a signal simultaneously transmitted by all BSs.

Therefore, the PSS may not be suitable for measuring the signal quality of each BS. Accordingly, the UE may use the SSS or PBCH to measure the signal quality of each BS (or each beam of the BS) for RLM measurement.

Specifically, information on the SSS or PBCH (i.e., a DM-RS in the PBCH in the SS block, which is used by the UE to perform RLM, will be described in detail.

(1) Average SNR (CSI) Over SS Block Bandwidth: SSS & PBCH

In a communication system, the SNR is the most basic indicator for representing the signal quality. Thus, the UE may perform RLM by measuring the SNR of the SSS or PBCH in the SS block or measuring the average SNR over entire SS block bandwidth or partial SS block bandwidth (when a defined signal occupies the partial SS block bandwidth). In this case, since the SNR may differ per subcarrier due to the OFDM characteristics of the NR system to which the present invention is applicable, a method of obtaining the effective SNR of a reference channel (e.g., PDCCH or PDSCH) using the measurement method similar to that used for CSI and mapping the obtained SNR to the BLER may be applied to calculate the average of corresponding measurement values.

When a data channel (PDSCH) or PDCCH is defined as the reference channel for RLM and when the SS block is used as a channel for measuring the quality thereof the reference channel transmission method may be different from the measurement channel transmission method. For example, the PBCH may be single port transmission, but the PDCCH may be SFBC (Space Frequency Block Coding) transmission. The precoding methods applied to the PDSCH, PBCK, PDCCH, etc. may also differ. In this case, based on the differences, a suitable conversion method may be selected and used.

The UE may autonomously compensate for the differences or receive offset information for compensation from the BS.

In addition, even when the reference channel and performance measurement channel are transmitted in the same manner, the channels may have different transmission power. In this case, the BS may inform the UE of differences between the transmission methods and information on transmission power of each channel through RRC signaling. Here, the transmission power may include differences between beam gains though beamforming.

In the following description, unless otherwise specified, it is assumed that the UE measures the effective SNR (or SINR) that represents the channel quality of the reference channel using signal power and noise power on (time-frequency) resources where the channel for measuring the communication quality is present.

However, when interference coordination is used as in the LTE eICIC (enhanced Inter Cell Interference Coordination) system or when interference is received in various directions as in the CoMP (Coordinated Multi Point), if the noise power significantly fluctuates while the UE measures the SNR or if the BS controls interference to operate the corresponding system, information on the noise and interference on specific time resources may be required for RLM at the UE. In this case, the BS may transmit to the UE information on physical resources for measuring the noise power for the RLM measurement through RRC signaling, and the UE may use the information on the physical resources received from the BS in measuring the SNR for the RLM measurement. Additionally, if the BS does not inform the UE of any physical resource for measuring the noise power for the RLM measurement, the UE may select resources suitable for SNR measurement to perform the RLM.

(2) PBCH Message Error Rate

Unlike the SSS, CRC (cyclic redundancy check) for checking whether a received message is correct is attached to the PBCH. Accordingly, the UE may information on the PBCH message error rate in measuring the channel quality for RLM by checking the CRC attached to the received PBCH. In this case, if it is determined that a time required for securing the accuracy of the PBCH message error rate is too long compared to use it as RL recovery, the UE may use the number of contiguous CRC errors in the PBCH as information corresponding thereto.

For the same system information, the PBCH may be divided into several signals and transmitted during a relatively long time in order to secure cell coverage. Thus, the UE may receive the PBCH by combining the corresponding signals. Transmission of the message error rate for RLM may be defined before or after combining the signals according to the need.

(3) PBCH (or SSS, PBCH DM-RS) Bit Error Rate

In the case of the PBCH message error rate, since the probability of false alarm for the CRC is extremely low, there may be almost no error in the channel quality measurement. However, when high resolution accuracy is required, the UE should perform measurement and determination during a long time.

To overcome this problem, the UE may use a bit error rate for the PBCH. Generally, in the case of a reference signal, since the sequence is known in advance, the UE may estimate the bit error rate (BER). However, when information is not known in advance like a data channel, it is difficult for the UE to measure the BER on the data channel.

However, in the case of the PBCH, the UE may receive the PBCH in the cell acquisition procedure. Once the UE receives the PBCH, the UE may expect information every time like the super frame number (SFN). Thus, the UE performs encoding of PBCH message information, measure the (coded-) bit error rate (or symbol error rate of the PBCH modulation symbol as information corresponding thereto) using the encoding results, and then perform RLM using the measured (coded-) bit error rate. In this case, if the PBCH is divided into several signals and transmitted like the above-described method of using the message error rate, the message error rate may be defined before or after combining the PBCH signals.

Alternatively, in some cases, it may be determined that PBCH encoding and BER measurement is too complicated. In this case, the UE may use the PBCH DM-RS, which is used for PBCH reception, or bit error rate for the SSS as the information similar to the above-described information.

When the PBCH (SSS, or PBCH DM-RS) bit error rate is measured, the UE may use scrambling or code spreading for randomizing an interference signal. In this case, the UE may improve the measurement accuracy by measuring the bit error after descrambling or code dispreading.

Solution 2: DCI (or DM-RS) for RLM is Defined in PDCCH Common Search Space (CSS) and Transmitted Periodically The above-described PBCH may have a too long period to use it for RLM according to the configuration of the system or specification. If the period is too long, a time required for recovery after RLF may also be increased, and this may cause user service disconnection. Thus, a periodic signal having a period shorter than that of the SS block should be defined, and the UE need to perform RLM using the periodic signal.

Accordingly, a method for defining a signal (or channel) for RLM in the PDCCH and RLM metric using the same is proposed. Particularly, when the BS uses multiple beams, the signal for RLM may be defined for each beam.

(1) DCI Transmission for RLM

The DCI for RLM which can be received by all users may be defined. In this case, the RLM-DCI may be transmitted. In this case, the RLM-DCI may be transmitted in the common search space so that all users can receive the RLM-DCI. The RLM-DCI may include (a) random information and/or (b) information for delivering system information periodically.

In the case of (b), the DCI used for periodically transmitting system information may be used as the RLM-DCI. The UE may perform RLM by defining the detection rate (or missing rate) of the corresponding DCI. At this time, since the information transmitted through the corresponding DCI is not previously known, the UE may perform error correction and CRC detection with respect to the received signal. Thereafter, if the CRC detection results indicate that after the error correction, the detected signal has no error, the UE may consider the final detected signal as the signal transmitted from the BS. In addition, using this signal, the UE may measure the BER that represent how many errors were present in the signal before the error correction. In other words, the UE may use the BER measured for the packet of which the CRC detection results of the signal are good after the error correction as additional information for RLM.

In the case of (a), that is, regarding the random information, the UE may perform RLM after combining BER information and the CRC results of all messages using the information known to both the UE and BS.

In the both cases of (a) and (b), the UE may measure the SNR in each subcarrier of the DM-RS transmitted through the RLM-DCI and then perform RLM by converting the measured value into average channel quality information (similar to the method applied for the PBCH DM-RS).

In addition, the UE may receive, from the BS, information transmitted for generating SNR information on the SS block (e.g., information on channel transmission methods, SNR offset information on a difference between channel transmission methods, information on transmission power of channels, time-frequency resource restriction information for interference signal measurement). Here, the transmission power may include a difference between beam gains through beamforming.

(2) Dummy (or Common) DM-RS in CSS for RLM

In the case of the RLM-DCI transmission method in section (1), if the number of UEs in the cell increases, the following issues may occur.

1> When the RLM-DCI is preferentially transmitted, there may be insufficient resources to allocate DCI in the CSS.

2> When the DCI to be transmitted in the CSS is preferentially transmitted, the RLM-DCI transmission should be dropped.

To solve these problems, the BS may transmit only a dummy DM-RS without performing DCI transmission. In this case, the dummy DM-RS may collide with the existing DCI in the CSS at RE level. Thus, when allocation is performed such that it does not collides with the DM-RS of the DCI in the CSS, the UE may perform DCI reception by ignoring the dummy DM-RS. In this case, the BS may provide information on resources for the dummy DM-RS to all UEs.

Similarly, the RS structure where multiple users can commonly receive the DM-RS for DCI reception in the CSS. In this case, even if there is not DCI to be transmitted, the BS may transmit a common DM-RS for the DCI in the CSS, and the UE may measure the reception quality of the common DM-RS in the CSS, which the UE intends to receive, and use the corresponding measured value for RLM. To this end, although there is no DCI, the BS may inform the UE of the period in which the common DM-RS defined in the CSS is transmitted.

(3) Communication Quality Measurement Using DCI

As described above, the SNR may be used as the most basic indicator for representing the signal quality in the communication system. Thus, the UE may perform RLM by measuring the SNR of the SSS or PBCH in the SS block or measuring the average SNR over entire SS block bandwidth or partial SS block bandwidth (when a defined signal occupies the partial SS block bandwidth). In this case, since the SNR may differ per subcarrier due to the OFDM characteristics of the NR system to which the present invention is applicable, a method of obtaining the effective SNR of a reference channel (e.g., PDCCH or PDSCH) using the measurement method similar to that used for CSI and mapping the obtained SNR to the BLER may be applied to calculate the average of corresponding measurement values.

In addition, when a data channel (PDSCH) or a control channel (PDCCH) is defined as the reference channel for RLM and when the dummy DCI or DCI for RLM is used as the channel for measuring the quality thereof, the reference channel transmission method may be different from the measurement channel transmission method. For example, the PBCH may be single port transmission, but the PDCCH may be SFBC (Space Frequency Block Coding) transmission. The precoding methods applied to the PDSCH, PBCK, PDCCH, etc. may also differ. In this case, based on the differences, a suitable conversion method may be selected and used.

The UE may autonomously compensate for the differences or receive offset information for compensation from the BS.

In addition, even when the reference channel and performance measurement channel are transmitted in the same manner, the channels may have different transmission power. In this case, the BS may inform the UE of differences between the transmission methods and information on transmission power of each channel through RRC signaling. Here, the transmission power may include differences between beam gains though beamforming.

(4) Case in which Multiple Channels are Used

As described above, when the SS block is intermittently transmitted (or the transmission period is too long), the UE may be configured to use DCI (or DM-RS) for RLM. In this case, as a measurement channel for RLM, both the SS block and DCI for RLM may be used together.

In this case, if a plurality of channels are used for RLM, the BS may indicate which one of the SS block and DCI for RLM will be used through RRC signaling.

Alternatively, the UE uses the SS block as a basic channel for RLM, but if the DCI (or DM-RS) for RLM is provided, the UE may use the DCI (or DM-RS) for RLM as a channel for RLM. That is, when resource information related to the DCI for RLM is not valid, the UE may perform the RLM using the SS block.

As a modification example, in the implementation step, the UE may be configured to use the two types of information simultaneously.

Solution 3: CSI-RS for RLM is Defined and Transmitted Periodically

As described above, when the SS block transmission period is too long, it may be difficult to use it as the channel for RLM.

Thus, a method for defining a CSI-RS for RLM (per BS or beam) (hereinafter referred to as an RLM-CSI-RS) will be described in detail in this section. In this case, the BS may periodically transmit the RLM-SCI-RS by setting the transmission period suitable for the RLM characteristics. Alternatively, the BS may aperiodically transmit the RLM-CS-RS under its control while maintaining the transmission period suitable for the RLM characteristics (for the purpose of its scheduling freedom).

(1) RLM-CSI-RS Resource Allocation

RLF means that the UE cannot normally communicate with the currently connected BS. Thus, if the BS uses multiple beams, RLM-CSI-RS resources need to be allocated to all beams.

Since RLM is the process for checking the communication quality after the UE establishes communication with the BS, the BS may (basically) inform the UE of resource allocation information of the RLM-CSI-RS during the connection step.

However, if the BS determines that informing all UEs of the resource allocation information of the RLM-CSI-RS during the connection step causes significant overhead, the BS may broadcast the corresponding information.

Additionally, the RLM-CSI-RS may be transmitted via multiple beams as described above. Thus, the RLM-CSI-RS may have the same characteristics as those of the CSI-RS for beam management. Accordingly, the RLM-CSI-RS may share resources with the BM-CSI-RS having the same characteristics. If the BM-CSI-RS is configured for the UE, the UE may use the corresponding configuration information as the configuration information for the RLM-CSI-RS without any separate configuration.

In addition, when the BS uses multiple beams, the BS may allocate the RLM-CSI-RS per beam. In this case, the RLM-CSI-RS may not have acquisition and synchronization functions as a signal. However, since the RLM-CSI-RS should have representativeness of given channel performance as performance reference, the RLM-CSI-RS may inform connection information with a synchronization signal per beam (for example, SS block) or a reference channel for RLF determination (e.g., channel transmitted in the U-SS (user-specific search space) such as the PDCCH) may be informed during the resource allocation process. Moreover, the RLM-CSI-RS may inform a connection relationship with two or more channels.

If the UE performs beam acquisition using the information through an SS block, the UE may measure the communication quality using the RLM-CSI-RS or RLM-CSI-RS set connected to the corresponding SS block.

Additionally, if the UE fails to receive any SS block, the UE may determine that the communication quality of a corresponding beam or beam set is the communication disabled state (e.g., equal to or less than the threshold, which is provided by the corresponding BS or predefined, or a state similar thereto) with no additional process. In this case, the UE may report to an RLM control device or higher layer that the quality of the corresponding beam or beam set is equal to or less than the predetermined threshold.

The RLM-CSI-RS may be transmitted in all beam directions. In this case, if the RLM-CSI-RS is transmitted via a narrow beam, compared to the channel established based on the above-described connection relationship (e.g., SS block QCL (Quasi Co-Located) with the RLM-CSI-RS), a plurality of RLM-CSI-RSs may be configured to have a connection relationship with a single channel. The plurality of RLM-CSI-RSs may be transmitted in all beam directions covered by the BS.

However, if it is determined that too many resources are wasted or UE complexity significantly increases, the RLM-CSI-RS may support some beam directions. In other words, for some beam directions, the UE may measure the channel quality using the RLM-CSI-RS, and for the remaining beam directions, the UE may measure the channel quality using the channel established base on the connection relationship with the RLM-CSI-RS. Thereafter, the UE may use the measured values as RLM information.

On the other hand, if it is determined that the RLM-CSI-RS and the channel established based on the connection relationship therewith are transmitted using similar beam width or the UE complexity significantly increases, only a single RLM-CSI-RS may be defined per beam. In this case, similarly, the RLM-CSI-RS may support some beam direction. In other words, for some beam directions, the UE may measure the channel quality using the RLM-CSI-RS, and for the remaining beam directions, the UE may measure the channel quality using the channel established base on the connection relationship with the RLM-CSI-RS. Thereafter, the UE may use the measured values as RLM information.

(2) RLM-CSI-RS Transmission Method

The RLM-CSI-RS may be transmitted periodically in the time domain due to the RLM characteristics. In this case, the BS may inform the UE of the transmission period and time of the RLM-CSI-RS during the process for allocating resources for the RLM-CSI-RS, and the UE may measure the communication quality at the transmission time based on the transmission period and time.

However, when the BS uses multiple beams, the BS should transmit the RLM-CSI-RS for each beam. More particularly, when the BS uses analog beams, it may be difficult to transmit the RLM-CSI-RS for each beam.

In this case, since the BS is unable to perform transmission in other directions in the symbol where the RLM-CSI-RS is transmitted, the BS may have a problem in performing dynamic scheduling, that is, the BS may not freely perform corresponding scheduling.

Accordingly, the BS may need to perform aperiodic RLM-CSI-RS transmission. To this end, the BS should inform the UE that the RLM-CSI-RS will be allocated at every transmission time or at a predetermined time before transmission.

Alternatively, the BS may aperiodically inform the UE of the RLM-CSI-RS transmission through DCI when the BS transmits information on data transmission and reception. However, this operation may not satisfy the RLM characteristics if the frequency of the data transmission and reception decreases.

Thus, new DCI needs to be defined to inform the RLM-CSI-RS transmission only, and the BS may inform the RLM-CSI-RS transmission through the new DCI. In this case, since the RLM-CSI-RS is a resource shared by multiple users, the DCI (or common RNTI information for reading the DCI) informing whether the RLM-CSI-RS is transmitted may be configured not only UE-specifically but UE-group-specifically. In this case, upon receiving the DCI that informs whether the RLM-CSI-RS is transmitted, the UE may perform RLM using information included in the DCI (e.g., information indicating which beam among multiple beams is used for transmission, information indicating which slot or symbol is used for transmission after the DCI reception, or information which resource is used for transmission if there are multiple resources).

(3) Measurement of Communication Quality Using RLM-CSI-RS

As described above, the SNR may be used as the most basic indicator for representing the signal quality in the communication system. Thus, the UE may perform RLM by measuring the SNR of the SSS or PBCH in the SS block or measuring the average SNR over entire SS block bandwidth or partial SS block bandwidth (when a defined signal occupies the partial SS block bandwidth). In this case, since the SNR may differ per subcarrier due to the OFDM characteristics of the NR system to which the present invention is applicable, a method of obtaining the effective SNR of a reference channel (e.g., PDCCH or PDSCH) using the measurement method similar to that used for CSI and mapping the obtained SNR to the BLER may be applied to calculate the average of corresponding measurement values In addition, when a data channel (PDSCH) or a control channel (PDCCH) is defined as the reference channel for RLM and when the dummy DCI or DCI for RLM is used as the channel for measuring the quality thereof, the reference channel transmission method may be different from the measurement channel transmission method. For example, the PBCH may be single port transmission, but the PDCCH may be SFBC (Space Frequency Block Coding) transmission. The precoding methods applied to the PDSCH, PBCK, PDCCH, etc. may also differ. In this case, based on the differences, a suitable conversion method may be selected and used.

The UE may autonomously compensate for the differences or receive offset information for compensation from the BS.

In addition, even when the reference channel and performance measurement channel are transmitted in the same manner, the channels may have different transmission power. In this case, the BS may inform the UE of differences between the transmission methods and information on transmission power of each channel through RRC signaling. Here, the transmission power may include differences between beam gains though beamforming.

(4) Measurement of Interference and Noise Power for RLM

1) Measurement of Interference and Noise Power Using IM-CSI-RS

In the following description, unless otherwise specified, it is assumed that the UE measures the SNR using signal power and noise power on (time-frequency) resources where the channel for measuring the communication quality is present.

However, when interference coordination is used as in the LTE eICIC (enhanced Inter Cell Interference Coordination) system or when interference is received in various directions as in the CoMP (Coordinated Multi Point), if the noise power significantly fluctuates while the UE measures the SNR or if the BS controls interference to operate the corresponding system, information on the noise and interference on specific time resources may be required for RLM at the UE. In this case, the BS may transmit to the UE information on physical resources for measuring the noise power for the RLM measurement through RRC signaling and the UE may use the information on the physical resources received from the BS in measuring the SNR for the RLM measurement.

In the case of the RLM-CSI-RS, the BS may provide the UE with additional resource allocation information for an RLM-CSI-RS for measuring noise power (hereinafter referred to as the RLM-IM-CSI-RS) during the RLM-CSI-RS resource allocation process. In the case of a multi-beam scenario, although resources for the RLM-IM-CSI-RS may be allocated in each beam, the resources for the RLM-IM-CSI-RS may be commonly allocated for multiple beams for efficient resource use.

2) Measurement of Noise and Interference Power Using Resources in CORESET

In the NR system to which the present invention is applicable, a plurality of PRB sets for PDCCH transmission are referred to as a CORESET. In this case, the BS may allocate multiple CORESETs for the UE. In the following description, a PDCCH transmission resource or CORESET may mean a time-frequency resource for PDCCH transmission.

According to the aforementioned configuration, in an environment where interference or noise from a neighboring cell or TRP is dominant, the UE may measure noise power using a zero power IM-CSI-RS. However, in the case of the IM-CSI-RS, since resources available for a data or control channel are used for interference measurement, if the UE is able to measure interference using other resources, the resource use efficiency can be improved. Thus, a method for allowing a UE to directly measure interference or noise power using resources allocated for PDCCH transmission will be described in detail in this section.

In the NR system to which the present invention is applicable, the PDCCH may be defined as the reference channel for RLM.

Generally, the UE should be able to transmit and receive basic data to maintain the current communication link with the BS. To this end, it is necessary for the UE to receive the PDCCH that carries scheduling information of data packets.

For this reason, the UE may determine as the reference of performance measurement whether the UE can receive the preconfigured PDCCH and compare the quality, which is measured using a channel or signal defined for performance measurement, with the reference.

In addition, for the same reason, it is desirable that the performance measurement channel has representative features of the PDCCH, and to this end, the BS may allocate resources in order for the UE to measure the amount of noise or interference in the PDCCH region.

Accordingly, it may be desirable that the BS allocate the RLM-IM-CSI-RS to resources for transmitting the PDCCH.

However, since the RLM-IM-CSI-RS requires additional resources as described above, if the UE is able to measure the amount of noise or interference without using the RLM-IM-CSI-RS, the resource use efficiency may be further improved.

As a method therefor, the UE may perform channel estimation using the DM-RS of which the transmission pattern is already known to suppress interference and noise, eliminate the signal corresponding to a PDCCH DM-RS using the channel estimated from the signal received on the resources, which are used for DM-RS transmission, and then consider the remaining signal as a noise or interference signal. Thereafter, the UE may obtain a desired measurement value by measuring the amount of the remaining signal. At this time, the UE may also determine whether the PDCCH is transmitted or not (more specifically, whether the DM-RS in the CORESET for assisting PDCCH reception is transmitted or not).

In this method, the UE requires information on the CORESET for PDCCH transmission and information related to DM-RS transmission, and the UE may obtain this information in a call setup process with the BS.

In particular, since the UE should perform the channel estimation and measure the amount of interference and noise using the DM-RS even when the PDCCH is not transmitted to the UE, the UE needs to obtain information on the position where the PDCCH DM-RS is transmission and information on the sequence thereof. Thus, the BS may transmit, to the UE, information on a certain slot among total slots, which is transmitted through the DM-RS with a sequence predetermined by the UE and BS, and transmit the DM-RS according to the relevant rule.

The BS may reserve CORESET resources to transmit the PDCCH and then transmit the PDCCH on the corresponding resources. However, this operation does not mean that the reserved CORESET resources are used only for the PDCCH. In other words, although some OFDM symbol in one slot are defined as the CORESET, the CORESET resources may be used together with adjacent resources for data transmission or as the PDSCH for emergency data transmission if necessary. Alternatively, when the necessity of UL transmission increases, resources including the CORESET OFDM symbols may be used as a UL slot.

In this case, if the UE does not have information thereon (or does not understand the information), the UE may perform the channel estimation using the DM-RS, which is assumed to be transmitted on CORESET resources, determine that no signal is transmitted thereon, and determine most or all of the received signals as interference or noise power. This operation may cause not only OUT-OF-SYNC corresponding to unnecessary or misunderstood information but also a problem of reestablishing a connection between the UE and BS.

However, if the BS is configured to use all CORESET resources only for the PDCCH transmission for this reason, it may significantly decrease the degree of freedom of the BS in terms of resource use.

Accordingly, when allocating CORESET resources to the UE, the BS may designate some CORESET resources as RLM resources for measuring the amount of noise and interference. At this time, if the BS does not provide a separate indication to the corresponding UE, the allocated resources cannot be used for the PDSCH or other uplink channels (specifically, channels or signals that cannot be used by a terminal to measure the amount of noise or interference). However, in the case of using the channels or signals that cannot be used for interference and noise measurement for RLM, the BS should transmit information thereon to the UE. For example, if the BS configures that some resources are not used for PDSCH or other uplink channels via the RRC configuration, the BS should inform the UE release of the preconfigured rule (for example, specific resources are not used for the PDSCH or other uplink channels). In this case, the UE may not measure the noise power of the corresponding channels or signals when performing RLM measurement.

In this case, the resource allocation information provided by the BS to the UE may include some or all of the following information.

Information indicating slots for RLM available for measuring interference and noise among resources for transmitting the PDCCH (e.g., when all slots #0 to #19 are set to a CORESET, slots #0, #4, #8, #12, and #16 are allocated as RLM resources for measuring interference and noise.)

Information indicating that some OFDM symbols can be used for the interference and noise measurement for RLM if the CORESET corresponding to the indicated slots is able to be transmitted in multiple OFDM symbols. In this case, the OFDM symbols includes OFDM symbol for DM-RS transmission (e.g., when a CORESET is composed of maximum three OFDM symbols, the first OFDM symbol for transmitting the PDCCH DM-RS is allocated as RLM resources for the interference and noise measurement).

Information on frequency resources. In this case, if multiple CORESETs are allocated for the frequency resources, the information on the frequency resources may indicate some CORESETs or some frequency resource in the CORESETs (e.g., when two CORESETs, each of 5 MHz, are allocated to a UE allocated 10 MHz, the BS allocates the first OFDM symbol in the first CORESET as RLM resources for the interference and noise measurement).

The above-described information may be differently configured per user (or UE) by considering an environment where beam directions are coordinated between BS for optimization.

Information indicating whether specific resources can be used for the interference and noise measurement for RLM (e.g., when there is no PDCCH to be transmitted on specific resources, the BS should not transmit any signal. Alternatively, when the BS transmits other channels, the BS may transmit only the channel including the DM-RS having the same resource and sequence information as that of the PDCCH DM-RS. Alternatively, when the specific resources are used for other purposes, the BS should inform the UE that the corresponding resource cannot be used for the interference and noise measurement for RLM (e.g., via RRC signaling, DCI, etc.)).

Information on a CORESET (e.g., when the BS intends to use a CORESET for transmitting the PDSCH or other channels, the BS should not use RLM resources for the interference and noise measurement as PDSCH resources, and upon being allocated the PDSCH, the UE should use them as information for PDSCH resource mapping. Thus, the BS should inform all UEs of information thereon). At this time, the basic information transmitted by the BS may include information on specific resources defined in time/frequency domain among all resources valid for control channel transmission.

When the UE is allocated the RLM resources for the interference and noise measurement through the above-described information, the UE may perform the channel estimation using the corresponding resources to suppress the interference and noise. In addition, after eliminating a signal corresponding to the PDCCH DM-RS using the channel estimated from the signal received on the resources, which are used for the DM-RS transmission, the UE may consider the remaining signal as an interference or noise signal and then measure power thereof. Thereafter, the UE may calculate metric for measuring the quality of RLM channels using the measured value and the signal strength from the serving BS, which is obtained from an RS for RLM. In addition to this, if the UE is able to deduce additional information from not only the allocated resources but other resources (this may differ according to implementation methods), the UE may measure the amount of the noise and interference using information obtained from the two types of resources.

The resources and methods for measuring the amount of interference and noise described in this section may be applied even when other channels are defined instead of using the CSI-RS as a reference signal or channel for RLM (e.g., even if the secondary synchronization signal (SSS) in the SS block is defined as the measurement signal for RLM, the SSS is used only for obtaining the strength of a signal received from the BS in order to accurately reflect the interference resources, which are required on the reference channel, and the above-described method may be applied for the interference and noise-measurement).

(5) Case in which Multiple Channels are Used

As described above, if the SS block is intermittently transmitted, the RLM-CSI_RS may be configured to be used for RLM. In this case, the UE may use the SS block and RLM-CSI-RS as the measurement channel for RLM. That is, when the UE can use multiple channels, the BS may inform the UE which one of the SS block and RLM-CSI-RS shall be used via RRC signaling or L1 signaling (Layer 1 signaling).

Alternatively, the UE uses the SS block as a basic channel for RLM, but if information on the RLM-CSI-RS is provided, the UE may use the RLM-CSI-RS as a channel for RLM. That is, when the corresponding resource information is not valid, the UE may use the SS block as the channel for RLM.

Alternatively, the UE uses the RLM-CSI-RS as the basic RLM channel, but in some cases, the UE may additionally use the SS block, which is not QCL with the RLM-CSI-RS. At this time, the BS informs the UE of the RLM-CSI-RS resource configuration and may then configure whether the UE shall use the SS block, which is not QCL with the RLM-CSI-RS.

In this case, the RLM-CSI-RS and SS block may have different beam gains, which are generated when the BS forms beams, or different transmission power level, which are allocated during the transmission step. Thus, the BS may inform a transmission power difference for the associated PDCCH for each channel. Alternatively, the BS may inform the transmission power difference for the PDCCH only for a basic channel (e.g., RLM-CSI-RS) and relevant offset values for additional channels. Moreover, the BS may assume that one channel has the same transmission power level as that of the PDCCH and then inform the UE of the transmission power difference for another channel using an offset value.

When multiple channels are used as described above, the UE may be configured to appropriately use two types of information for the same beam in the implementation step.

When different configurations are used as described above, the UE may reflect the offset (difference) value configured by the BS in measuring the reception quality of each reference signal and then use it for IS/OOD determination.

As mentioned in the foregoing description, when the SS block and RLM-CSI-RS are simultaneously configured and used for and by the UE, the BS should consider a case where transmission characteristics of the two channels are different (for example, when the two channels have different transmission power level) and inform the UE of the configuration therefor. However, if the BS transmits the PDCCH using a beam corresponding to SS block and a beam corresponding to the RLM-CSI-RS, transmission power level may differ because different DCI format are used or beam gains are included as described above.

To this end, the reference PDCCH configuration may be defined for RLM, and more particularly, the BS may define different configurations for two reference signals. In this case, from the perspective of the UE, it may be interpreted to mean that different Qin/Qout are defined for each reference signal.

Considering this, although the BS does not indicate any separate configuration value for the two reference signals, the UE may operate by considering different Qin/Qout for each of the reference signals based on the predefined reference PDCCH configuration. In other words, the UE may determine IS/OOS by comparing the communication quality measured using the SS block with Qin_SS/Qout_SS and determine IS/OOD by comparing the communication quality measured using the RLM-CSI-RS with Qin_CSI/Qout_CSI.

Beam Recovery and RL Recovery in Multi-Beam Scenario

As described above, the NR system to which the present invention is applicable can operate using multiple beams. In this system, the UE and BS need to configure an optimal beam pair for uplink and downlink in a connection step and continuously perform beam tracking to maintain the optimal beam pair.

However, during this communication process, communication reception quality may be significantly degraded in the following cases: when a radio link becomes unavailable due to several reasons (for example, a case in which HO attempt is not made at the proper time, a case in which a UE fails in performing time and frequency tracking due to sudden degradation in reception quality, etc.); and when beam tracking is not properly performed although there is no problem in the radio link.

In the former case, if this situation continues during a predetermined time, the UE should perform a recovery procedure due to RLF (in the LTE system, the UE performs cell reestablishment).

In the latter case, the UE should maintain the communication with the serving BS (e.g., establishes a serving beam) by performing a beam recovery procedure during a short time.

That is, the UE should determine whether the current communication state requires the recovery procedure due to RLF or the beam recovery procedure. Since the radio link recovery procedure may require more time than the beam recovery procedure in general, if the UE fails to make correct determination, unnecessary service interruption may occur.

Hereinafter, a method for determining whether to perform beam recovery or radio link recovery using the above-described metric for RLM (more specifically, a method for determining, at the physical layer, whether the current state is either a beam failure state or an OUT-OF-SYNC state) will be described in detail. In the NR system using multiple beams, a method for transmitting an SS block per beam (or beam group) is being discussed for the initial beam acquisition process. In the case of the CSS and RLM-CSI-RS for DCI transmission, the same resources may be allocated for a group of UEs existing in the same beam region similar to the SS block.

Based on the above-described features, it is assumed that the UE uses the SS block, RLM-CSI-RS associated with to the SS block, or DCI in the CSS as a reference signal (or channel) for RLM.

In the case of DL, the UE may be allocated a beam tracking signal set such as the CSI-RS and perform tracking of a beam pair. During this operation, if a beam tracking failure condition, which is configured by the BS or autonomously determined by the UE, is satisfied, the UE should determine which recovery procedure the UE will perform.

If the UE selects a different transmission beam, the UE may measure the communication quality of the different beam to check whether there is no problem in the communication quality. In this case, the UE may measure the SS block, RLM-CSI-RS, or RLM-DCI in the CSS per beam as the communication quality of each beam. If there is a beam better than the threshold configured by the BS (or defined in relevant standards) for beam recovery among multiple beams, the UE may determine that recovery is possible through the beam recovery procedure. Otherwise, the UE may perform an RLM process (that is, the UE may determine the OUT-OF-SYNC state and operate according to the predetermined rule). For this operation, a channel capable of defining the reference channel and measurement channel for RLM may be defined in each beam set.

In summary, in the case of the system using multiple beams, the UE may measure the communication quality of all beams for measurement channels for RLM. If the communication quality of all beam is less than the reference value, which is predefined or configured by the BS (for example, in the case of a beam for which the beam acquisition process is not completed, if the UE does not measure its channel quality, the UE determines that it is less than the reference value), the UE may perform the beam recovery procedure (in practice, physical layers report the beam failure) rather than the recovery procedure due to RLF (in practice, physical layers report OOS to higher layers, and if OOS is reported during a predetermined time or more, the recovery procedure is performed).

In other words, when the threshold (Q_OUT), which is configured by the BS or defined in the relevant standards, is given, if the communication quality of all beams is less than the threshold (Q_OUT), the UE determines the OUT-OF-SYNC state.

Meanwhile, different thresholds may be used for the IN-SYNC state based on the previous state like the legacy LTE system. That is, if the previous state is the IN-SYNC state, the threshold for determining OUT-OF-SYNC (e.g., Q_OUT) may be used as it is. In this case, the UE may determine the IN-SYNC state if the communication quality of at least one beam (resource) among all beams (resources) is more than Q_OUT. On the contrary, if the previous state is the OUT-OF-SYNC state, another threshold (e.g., Q_IN) may be used to avoid the ping-pong effect between IS and OOS. In this case, the UE may determine the IN-SYNC state if the communication quality of at least one beam (resource) among all beams (resources) is more than Q_IN. When the UE estimates the communication quality of each resource, if each resource has a configuration different from that of the PDCCH (e.g., transmission power), the UE may reflect the different configuration in estimating the communication quality.

Relationship Between RLM-RS and BM-RS

In a communication system using multiple beams like the NR system, beam management for continuously tracing and connecting a serving beam that provides the optimal communication between the BS and UE may be performed together with RLM for monitoring whether the UE can perform stable communicate with the BS at cell level.

If RLF occurs during the PLM process (i.e., the RLF means a state in which the UE is unable to receive the PDCCH from the BS, and more particularly, a case in which it is determined that the quality of all beams is less than a certain threshold, by measuring a virtual PDCCH BLER), the UE performs the RRC reestablishment procedure as the radio link recovery procedure. If beam failure occurs in the beam management procedure (i.e., in the NR system, serving beams are used for PDCCH reception and the beam failure means a case in which the quality of serving beams is less than a certain threshold during a predetermined time), the UE may perform the beam recovery procedure to reconfigure the serving beam.

To support this UE operation, a reference signal set for measuring the channel quality with respect to each function may be configured.

In the NR system to which the present invention is applicable, an RLM-RS set for performing RLM (e.g., SS block, CSI-RS, etc.) may be defined, and a BR-RS set for assisting to configure a new serving beam during the beam recovery procedure (e.g., RSs for new candidate beam identification, SS block, CSI-RS, SS block & CSI-RS, etc.) may be defined together with a BT-RS for performing beam tracking for the beam management.

Each of the RSs is configured for different operation, and basically, the BS may independently configure each RS such that the function of each RS can be stably performed. However, if the RLM-RS for RLM and the BR-RS for beam recovery are configured to be totally independent from each other, that is, they are completely different from each other, the following problems may occur in the UE implementation.

For example, it is assumed that the BS configures the system using 8 beams and transmits SSBs corresponding to {SSB1, SSB2, . . . , SSB8} for the individual beams.

In this case, the BS may configure {SSB1, SSB2, SSB3, SSB4} as RLM-RSs and {SSB2, SSB3, SSB4, SSB5} as BR-RSs for one UE. If beam failure occurs while the UE performs the beam management operation, the UE may detect SSB5 by performing a process for detecting the optimal beam with respect to the BR-RSs to discover a new serving beam. However, in this case, the UE may measure the cannel quality only for SSB1 to SSB4 based on the configured RLM-RS set and continuously report OOS (OUT-OF-SYNC) to the RRC layer based on the measured information.

At this time, if the BS does not reconfigure the RLM-RS set rapidly, the UE determines RLF and then performs the RRC reestablishment procedure. That is, even though the UE can stably maintain the communication with the BS by performing the beam recovery procedure, the UE may unnecessarily perform the RL recovery procedure.

Unlike the above-described example, it can be assumed that the BS configures {SSB1, SSB2, SSB3, SSB4} as RLM-RSs and {SSB2, SSB3, SSB4, SSB5} as BR-RSs for one UE. In this case, if beam failure occurs while the UE performs the beam management operation, the UE may not obtain the desired quality from any RS in the BR-RS set in spite of performing the process for detecting the optimal beam with respect to the BR-RSs to discover a new serving beam. However, at this time, the UE may measure the cannel quality only for SSB1 to SSB4 based on the configured RLM-RS set and, if the beam corresponding to SSB1 has enough quality to perform the communication with the BS, report IS (IN-SYNC) to the RRC layer based on the measured information.

However, in this case, the UE cannot perform any operation until failure occurs in the beam recovery procedure.

This problem may be solved by allowing the UE to use as RLM-RS resources BR-RS resources for new beam identification during the beam recovery procedure. To this end, if the BS transmits RLM-RS resource configuration information for RLM to the UE, the UE may use corresponding resources as BR-RS resources. On the contrary, if the BS transmits BR-RS resource configuration information for beam recovery to the UE, the UE may use corresponding resources as RLM-RS resources.

In the NR system to which the present invention is applicable, either the SS block or CSI-RS or both the SS block and CSI-RS may be used as the BR-RS.

However, if the SS block and CSI-RS are simultaneously used as the BR-RS, the UE may not share and use the BR-RS and RLM-RS as described above.

To this end, when the SS block and CSI-RS are configured to be simultaneously used as the BR-RS, the BS may designate SS blocks associated with the individual CSI-RSs (e.g., an SS block with correlation or an SS block QCL with a corresponding CSI-RS) in the parameter configuration process. On the contrary, the BS may designate preconfigured CSI-RSs associated with the individual SS blocks (e.g., a CSI-RS with correlation or a CSI-RS QCL with a corresponding SS block). Upon receiving the BR-RS configuration, the UE may configure an RLM-RS set so as to use both the explicitly configured SS blocks and the SS blocks associated with the CSI-RSs or both the explicitly configured CSI-RSs and the CSI-RSs associated with the SS blocks when configuring RLM-RSs.

Configuration of RLM-RS and Monitoring RS Set to Reduce Signaling Overhead or UE Complexity As described above, the BS may allocate RLM-RSs (in some use cases, the RLM-RS may be replaced with the RS for beam management, but for convenience of description, the term "RLM-RS" is commonly used), and the UE may measure the link quality for all allocated RLM-RSs.

However, if the number of beams supported by the BS (e.g., the maximum number of SS blocks may be set to 64) is too large, it may be difficult for the UE to monitor all RLM-RSs in terms of receiver complexity.

To solve this problem, the following two methods may be considered:

(1) The number of RLM-RSs configured by the BS for the UE is limited below a certain value.

(2) The BS configures, for the UE, an RLM-RS resource set corresponding to all the beams managed by the BS, and the UE selects a sub-set from the configured RLM-RS resource set and performing monitoring on the selected sub-set.

In the case of method (1), assuming that the BS operates the system using multiple transmission beams, the BS may obtain the reception quality of each beam for a BM-RS resource set allocated for beam management based on L1-RSRP (Layer 1-Reference Signal Received Power), which is measured and reported by the UE and configure, for the UE, an RLM-RS resource set for RLM based on the reception quality of each beam.

Figure 12:
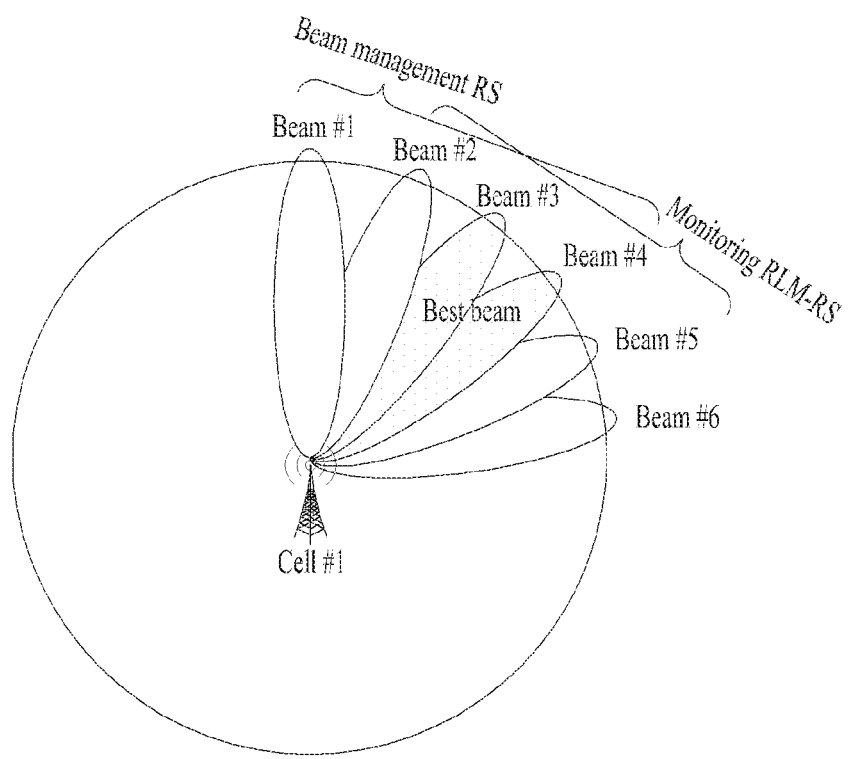
FIG. 12 schematically illustrates a case in which among N beams, the BS allocates BM-RSs to beams #1 to #4 and RLM-RS resources to beams #2 to #5.

FIG. 12 schematically illustrates a case in which among N beams, the BS allocates BM-RSs to beams #1 to #4 and RLM-RS resources to beams #2 to #5.

As shown in FIG. 12, the BS may allocate BM-RSs to beams #1 to #4 among N beams. In this case, if it is determined from L1-RSRP that beams #3 and #4 has the best quality, the BS may configure RLM-RS resources to beams #2 to #5 with respect to beams #3 and #4.

However, in this case, the BS should allocate an RLM-RS resource set whenever the L1-RSRP for BM-RSs, which is reported by the UE, is updated. Thus, the configuration via RRC signaling occurs too frequently so that signaling overhead significantly increases.

To reduce the overhead caused by the frequent RRC signaling, the present invention proposes the following methods.

The BS informs the UE of information on an RLM-RS resource set in a call configuration step, and at the same time, the BS configures and informs an RLM-RS resource sub-set based on serving beams, which will be indicated by the BS (for beam management) (for example, when four serving beams are supported, the resource sub-set may be configured such that CSI RSs #1 to #4 are allocated to beam #1 and CSI-RSs #3 to #6 are allocated to beam #2). In this case, the number of RLM-RS resources included in an RS resource sub-set may be predefined in relevant standards or determined according to the UE capability.

When the BS updates serving beams for the control channel or data channel, if the UE receives relevant information, the UE may autonomously perform the RLM-RS resource configuration without separate RRC signaling. In this case, if there are a plurality of serving beams and the UE does not have enough capability to cover all of the RLM-RS resources, which depends on the number of serving beams, the BS may configure for the UE the priority of the serving beams or the priority of the RLM-RS resources in the resource sub-set.

Accordingly, the UE may configure a monitoring RLM-RS resource set based on the priority. Thereafter, the UE performs RLM only on the configured monitoring RLM-RS resource set and may use the measurement results of the monitoring RLM-RS resource set as the RLM result for the cell.

In this case, the BS may indicate the priority of the serving beams through a message indicating the serving beams (e.g., RRC signaling message, MAC (Medium Access Control) CE (Control Element), etc.). Alternatively, the BS may indirectly indicate the priority of the serving beams without any separate indicator. For example, the BS may implicitly indicate the priority of the serving beams through beam index order, which is included in a specific message, or PDCCH search space size per beam.

Additionally, if the serving beam priority is changed without change in the serving beams, the BS may separately transmit information on the serving beam priority to the UE. In this case, since the information on the serving beam priority may be dynamically configured through transmission via MAC CE or DCI.

In the above-described configuration, the RS type of the RLM-RS resource set may be different from that of a serving beam RS. For example, the CSI-RS may be used as the beam management RS for beam management, whereas the SS block may be used as the monitoring RLM-RS for serving beams Hereinafter, method (2) will be described in detail. Similar to method (1), when configuring an RLM-RS resource set, the BS may transmit to the UE information on all RLM-RS resources supported by the BS. In addition, the UE may autonomously configure a monitoring RLM-RS resource set.

However, in the case of method (1), the BS configures serving beams for the UE based on a beam quality report during the beam management procedure, and the UE configures a sub-set based on the corresponding information. On the contrary, in the case of method (2), the UE may autonomously configure a sub-set based on the quality of the RLM-RS resource set, which is configured regardless of serving beam information.

In this process, the quality of RLM-RS resources measured for the resource sub-set configuration may be measured using simple metric (e.g., RSRP, RLM-RS signal power/RLM-RS noise power, etc.), compared to the metric for RLM (hypothetical PDCCH BLER). Accordingly, the UE may significantly decrease the complexity. To this end, the UE may periodically update X monitoring RLM-RS resource sets (the value of X may be determined by the UE capability or predefined in relevant standard) with the best or optimal quality on the above-described simple metric, perform RLM only on the configured monitoring RLM-RS resource sets, and use the measurement result of the corresponding monitoring RLM-RS resource sets as the RLM result.

However, configuring the RLM-RS monitoring set based on the simple metric may cause a situation that beam coordination information, which is reflected by the BS in cell deployment, cannot be used at all. Thus, the present invention proposes not only the above-described methods but a signaling method for the BS to assist the corresponding methods.

That is, the UE may preferentially measure the quality of an RLM-RS resource set using a simple metric in order to reduce its complexity (as described above) and select an RLM-RS with the optimal or best quality based on the measurement results. In this case, in order for the UE to configure a monitoring RLM-RS resource set based on the measurement results, the BS may inform the UE of link information on mutually correlated RLM-RS resources per RLM-RS resource using RLM-RS resources with a similar beam direction, RLM-RS resources transmitted from the same TRP, or RLM-RS resources covering a similar reception area. Thereafter, the UE may configure the monitoring RLM-RS resource set using the RLM-RS resources with the best or optimal quality and the link information transmitted from the BS.

Figure 13:
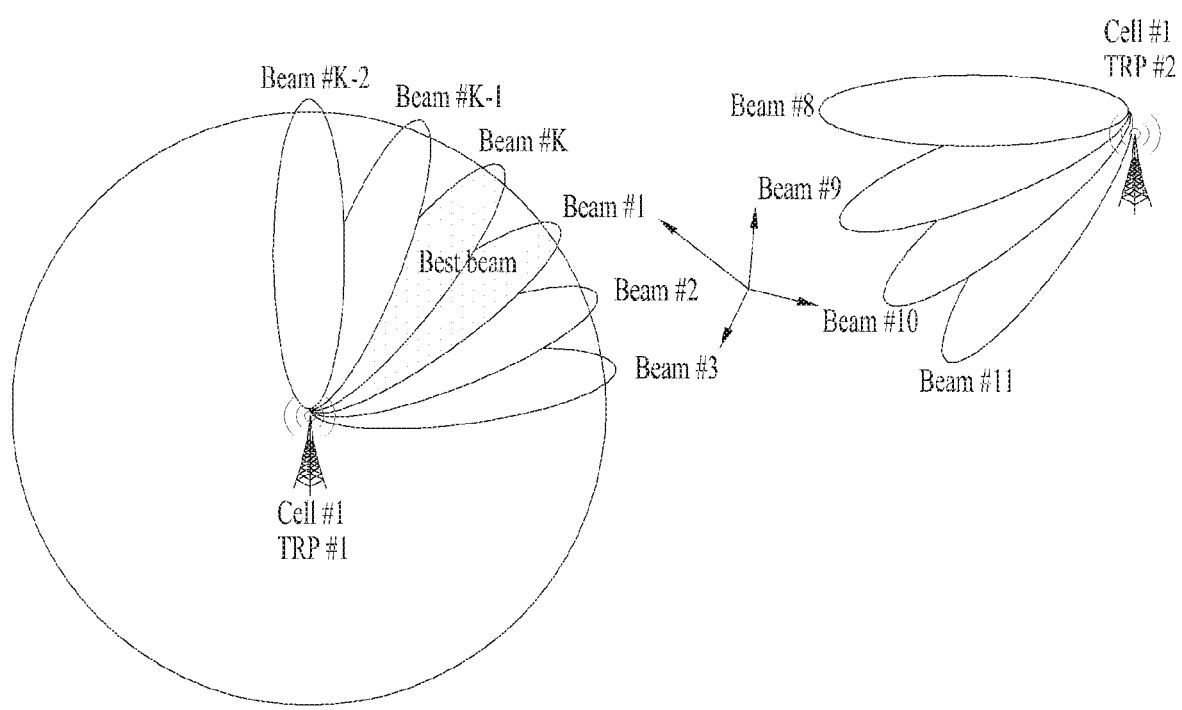
FIG. 13 is a diagram for explaining an RLM method for the UE when RLM-RE resource #2 is measured to have the best RSRP and RLM-RS resources {#1, #3, #9, #10} are link to RLM-RS resource #2.

FIG. 13 is a diagram for explaining an RLM method for the UE when RLM-RE resource #2 is measured to have the best RSRP and RLM-RS resources {#1, #3, #9, #10} are link to RLM-RS resource #2.

As shown in FIG. 13, when the UE defines RSRP as the simple metric, if RLM-RE resource #2 is measured to have the best RSRP and RLM-RS resources {#1, #3, #9, #10} are link to RLM-RS resource #2 (in this case, it is assumed that the BS determines five beams share a similar reception area), the UE configures RLM-RS resources {#1, #2, #3, #9 #10} as a monitoring RLM-RS resource set and may perform RLM metric (e.g., hypothetical PDCCH BLER) measurement o the resource set. Thereafter, the UE may configure RLM-RS resource sub-sets for monitoring in the RLM-RS resource set. By doing so, the UE may reduce the number of times of RLM processing, which requires a large amount of calculation, thereby reducing the UE complexity.

From the perspective of the UE, RLM-RS resources measured for RLM may differ while the UE is connected to the BS. For example, assuming that the UE performs RLM using monitoring beams {#2, #3, #4, #5}, if the best beam differs, the current monitoring beams are changed to monitoring beams {#4, #5, #6, #7}. Hereinafter, a description will be given of how the UE operates in the above case.

Specifically, when the UE reports IS/OOS to the higher layer every 10 ms, the UE may measure the link quality of all the beams configured for monitoring, that is, beams {#2, #3, #4, #5} based on the definition of IS/OOS during a period of 10 ms (in this case, the UE determines final IS/OOS of a corresponding cell by reflecting the states of all configured beams) and then report the RLM state. In this case, if a monitoring beam sub-set is changed after the UE performs monitoring on beams {#2, #3}, the UE may operate as follows.

First, to maintain the periodic reporting property, which is generally required for RLM, the UE measures the link quality of all the remaining beams, beams {#4, #5}, reports the link quality of the corresponding cell to the higher layer, and may measure the link quality of the changed resource sub-set at the time when the changed monitoring RLM-RS resource sub-set is applied.

Additionally, since the UE's higher layer stores the RLM status, timer value, etc. determined based on the link quality before the resources are changed, it should be determined whether the UE's higher layer resets the RLM status, timer value, etc. or continuously maintain the previous state after the resources are changed.

In this case, since the purpose of RLM is to reflect the final cell state, even if the RLM-RS resource set or sub-set is changed by a direct/indirect indication of resources defined by the lower layer via RRC signaling or UE's autonomous operation, it may be desirable that the UE's higher layer perform the RLM operation while maintaining the previous state.

Relationship Between Beam Failure and Radio Link Failure

In this section, the definition and operation of the OUT-OF-SYNC state and other additional states will be described in detail based on a relationship between the beam failure operation and RLF operation.

(1) Operation Based on Correlated Relationship Between Beam Failure and Radio Link Failure In the following description, it is assumed that the RS for beam management (hereinafter abbreviated as BM) is included in a set or sub-set of RLM-RSs.

The UE may continuously perform tracking of a serving beam using the RS for BM. If the communication quality of the serving beam does not satisfy a predetermined level, the UE may declare beam failure and perform the beam recovery procedure. Until completing the procedure, the UE may not be able to transmit and receive data packets to and from the BS. In this context, the corresponding state may be defined as the OUT-OF-SYNC state for RLM. In other words, it may be interpreted to mean that the RLM state is determined by the beam management state or the beam management state determines the RLM state.

When the communication quality of the serving beam is less than the predetermined threshold (e.g., Q_OUT), the UE may trigger the beam recovery procedure and at the same time, inform a higher layer (e.g., third layer (L3)) of the OUT-OF-SYNC state.

Additionally, the IN-SYNC state may be defined as follows based on the previous RLM state. First, if the previous state is the IN-SYNC state, the UE may define a state where the communication quality of the serving beam is more than Q_OUT as the IN-SYNC state, using the above-described threshold Q_OUT. On the other hand, if the previous state is the OUT-OF-SYNC state, the UE may define a state where the communication quality of the newly or previously configured serving beam is more than QIN as the IN-SYNC state.

In this case, upon receiving that the UE is in the OUT-OF-SYNC state, the L3 RRC layer may declare RLF very quickly and perform RLF recovery. However, if this operation is performed before the beam recovery procedure is completed, it may interrupt the beam recovery procedure. Therefore, the following countermeasures may be considered.

In the multi-beam scenario, the configuration of the timer for RLF depends on the time required for beam recovery, and it may be equal to or more than the time required for beam recovery. To implement this configuration, the above-mentioned condition may be predefined as a condition for configuring the RLF timer related parameter, and then it may be reflected in the timer parameter configuration. Alternatively, the BS may autonomously configure the RLF timer related parameter by reflecting the condition.

In the case of OOS due to beam failure (that is, when the communication quality of the serving beam is less than the threshold), the L3 RRC layer may not declare RLF during a predetermined time or increase the RLF timer during the corresponding time. Here, the "predetermined time" may be determined based on the time required for beam recovery. Alternatively, it may be configured by the BS or defined in relevant standards. To this end, regarding OOS due to BF, a separate state (OOS-BF) may be defined, and the OOS-BF related timer may be defined by the RRC L3 layer. Specifically, the L3 layer may increase the corresponding timer if the OOS-BF state is received from a lower layer and may not increase the RLF timer until the corresponding timer reaches a predetermined value (e.g., the aforementioned "predetermined time").

Thereafter, if the UE successfully completes the beam recovery, the UE may report the IN-SYNC state to the L3 layer in order to reset the RLF timer.

(2) Operation Based on Independent Relationship Between Beam Failure and Radio Link Failure In the following description, it is assumed that the RS for BM may be included in a set or sub-set of RLM-RSs or correspond to a different RS.

In this case, although the UE measures the communication quality of an RS set for beam tracking as the beam management operation and performs the operation for beam tracking & beam failure operation based on the measured communication quality, the UE may not report the RLF state.

As the operation for RLM, The UE may measure the channel quality of the configured RS set (for example, although it is defined as a rule that the RS set should be configured to include all beam directions, it may be changed according to the configuration of the BS. That is, the UE may operate without knowing whether the configured RS set includes all beams).

If the channel quality of all RS sets is equal to or less than a configured threshold or the channel quality is not detected, the UE may report the OUT-OF-SYNC state to the L3 (or RRC layer) periodically or aperiodically if necessary in order to inform that the UE is unable to communicate with the cell. In this case, although the UE declares beam failure based on the beam management operation and performs the beam recovery operation, the UE may report the IN-SYNC state if the channel quality of some RSs in the RS set is more than the configured threshold.

In this case, if the previous state is the IN-SYNC state, the UE may use the threshold for determining the OUT-OF-SYNC state (e.g., Q_OUT) as the threshold for determining the IN-SYNC state. However, if the previous state is the OUT-OF-SYNC state, the UE may use a different threshold (e.g., Q_IN) as the threshold for determining the IN-SYNC state to avoid the ping-pong effect between IS and OSS.

That is, the beam management state does not affect the IN-SYNC/OUT-OF-SYNC states determined during the RLM process. However, when the L3 layer does not declare radio link failure even though the recovery procedure due to beam failure fails or the recovery procedure does not detect a new beam during a predetermined time, this operation may cause that the operating time of the communication reestablishment procedure for radio link recovery is unnecessarily increased. Thus, when the UE operate independently from BF and RLF, the following countermeasures may be applied.

When the UE intends to perform the beam recovery due to beam failure that occurs during the beam management, 1) if anew serving beam candidate is not detected during a predetermined time (for example, it may be a value defined for the beam recovery operation, a value configured by the BS, or a value defined in relevant standard) or the quality of a newly detected beam is equal to or less than the threshold defined to determine the beam failure, or 2) if the UE sends a request for the beam recovery to the BS in order to perform the beam recovery but the BS does not transmit a response message (e.g., a message for confirming a new serving beam), the UE may declare beam recovery failure and then reports it to the L3 layer. Upon receiving the beam recovery failure, the L3 layer may operate in the same or similar manner as the radio link recovery procedure.

To this end, the UE may define a timer for the beam recovery and a parameter for determining the timer expiration at the first (L1) layer or second (L2) layer. In this case, the corresponding parameters may be preconfigured using parameter values for standards or implementation or configured by the BS.

If beams failure occurs during the beam management and the beam recovery procedure is initiated, the UE may report it to the L3 layer, and the L3 layer may separately configure a beam recovery related timer. In this case, as a parameter for the timer, a value configured by the BS or a predetermined value may be used. Thereafter, if it is reported to the L3 layer that the beam recovery has initiated, the L3 layer starts the timer. If "beam recovery success" is reported by the L1 or L2 layer before the timer is expired, the L3 layer resets the timer. On the other hand, if the timer is expired without any repot from the L1 or L2 layer, the L3 layer operates in the same or similar manner as the radio link recovery procedure.

The above-described two operations is to define operation for the connection reestablishment procedure due to beam recovery failure when beam failure is independent from radio failure. However, the two operations are different in that the timer for determining the connection reestablishment is defined at the L1 or L2 layer, which defines the beam management, or the L3 layer which defines radio link monitoring.

The aforementioned proposals of the present invention may be summarized as follows.

First, the UE may use the SSS or PBCH in the SS block as the reference signal for RLM. In this case, the average SNR, PBCH detection (or missing rate), PBCH, or SSS BER may be used as a metric for RLM.

For example, if the SS block has along period, the UE may perform RLM using newly defined DCI for RLM in the CSS. In this case, the DCI for RLM may be composed of common DM-RSs only.

In addition, the UE may perform RLM using anewly defined CSI-RS for RLM. In this case, the BS may inform the UE of link information with the SS block or a reference channel (e.g., PDCCH) as information on the CSI-RS for RLM in order to perform the RLM efficiently.

Moreover, the BS may define the IM-CSI-RS (zero power CSI-RS) as RLM resources for interference and noise measurement and allocate the corresponding resources to the UE. Alternatively, the BS may inform the UE of some resources in the CORESET as the RLM resources for the interference and noise measurement.

While performing the RLM process, the UE may determine whether to perform either the recovery procedure for beam tacking or recovery procedure for RLF. In this case, the UE performs monitoring per beam (or beam set) with respect to the above-described RLM-RS. If the monitoring results of all beam sets are equal to or less than a threshold, the UE may determine the OUT-OF-SYNC. If any one of the measurement results of a plurality of beam sets is more than the threshold, the UE may perform the beam recovery procedure.

In addition, while performing the RLM and beam management processes, the UE may report the recovery procedure due to beam failure to the higher layer and use it as assistant information for the RLM operation (e.g., operation for RLF based on information on beam recovery failure, temporary stop of the RLF timer due to beam recovery, etc.).

Moreover, when the SS and RLM-CSI-RS are simultaneously used, the BS may provide the UE with information on the transmission power level (including beam gains) of the SS and RLM-CSI-RS. Further, the UE may differently configure the reference PDCCH configuration with respect to the SS and RLM-CSI-RS. In this case, the UE may defines a multiple numbers of Qin/Qout and determine IS/OOS using Qin/Qout defined for each reference signal.

In addition, when RLM-CSI-RS resources overlap with BM-CSI-RS resources, the UE may replace the BM-CSI-RS resource configuration with the RLM-CSI-RS resource configuration.

Figure 14:
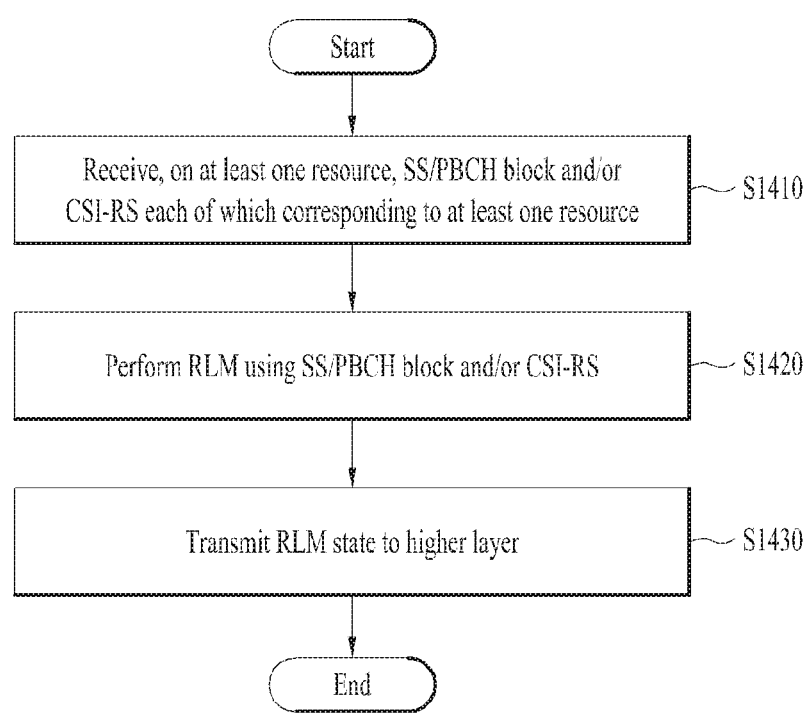
FIG. 14 is a flowchart illustrating a method for performing radio link monitoring by a UE according to an embodiment of the present invention.

FIG. 14 is a flowchart illustrating a method for performing radio link monitoring by a UE according to an embodiment of the present invention.

First, a UE according to the present invention receives, on at least one resource, at least one of a synchronization signal/physical broadcast channel (SS/PBCH) block and a channel state information reference signal (CSI-RS), each of which corresponds to the at least one resource [S1410]. In this case, the SS/PBCH block may include a primary synchronization signal (PSS), a secondary synchronization signal (SSS) and a physical broadcast channel (PBCH).

Specifically, the UE may receive, from a base station, either or both of the SS/PBCH block and the CSI-RS corresponding to each individual resource on the at least one resource.

In this case, the CSI-RS corresponding to the at least one resource may be configured to have the same characteristics as those of the CSI-RS for beam management (BM) corresponding to the at least one resource. In this case, the CSI-RS for the beam management may be separately configured.

In this case, a resource may be correspond to a beam. Thus, when a wireless communication according to the present invention supports multi-beam transmission, the UE may receive the corresponding SS/PBCH block and/or CSI-RS through at least one beam.

Next, the UE may assesses radio link quality using at least one of the received SS/PBCH block and CSI-RS [S1420]. Thereafter, the UE transmits radio link state information based on the assessed radio link quality to a higher layer [S1430].

In this case, a block error rate (BLER) for a hypothetical physical downlink control channel (PDCCH) or an effective signal to noise ratio (SNR) equivalent thereto may be used as a metric for assessing the radio link quality. Alternatively, a BLER for a (virtual) physical downlink shared channel (PDSCH) or an effective SNR equivalent thereto may be used as the metric for assessing the radio link quality.

Accordingly, if the radio link quality of every at least one resource is less than a threshold, the UE may transmit the radio link state information set to 'Out-of-Sync' to the higher layer.

In addition, if the received SS/PBCH block and CSI-RS have different transmission power, the radio link quality may be assessed by considering a transmission power difference between the received SS/PBCH block and CSI-RS.

Additionally, the UE may receive information on a correlation relationship between the SS/PBCH block and CSI-RS per resource. Thus, the UE may perform RLM using the information on the correlation relationship.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the BS to the UE through a predefined signal (e.g., physical layer signal, higher layer signal, etc.).

5. Device Configuration

Figure 15:
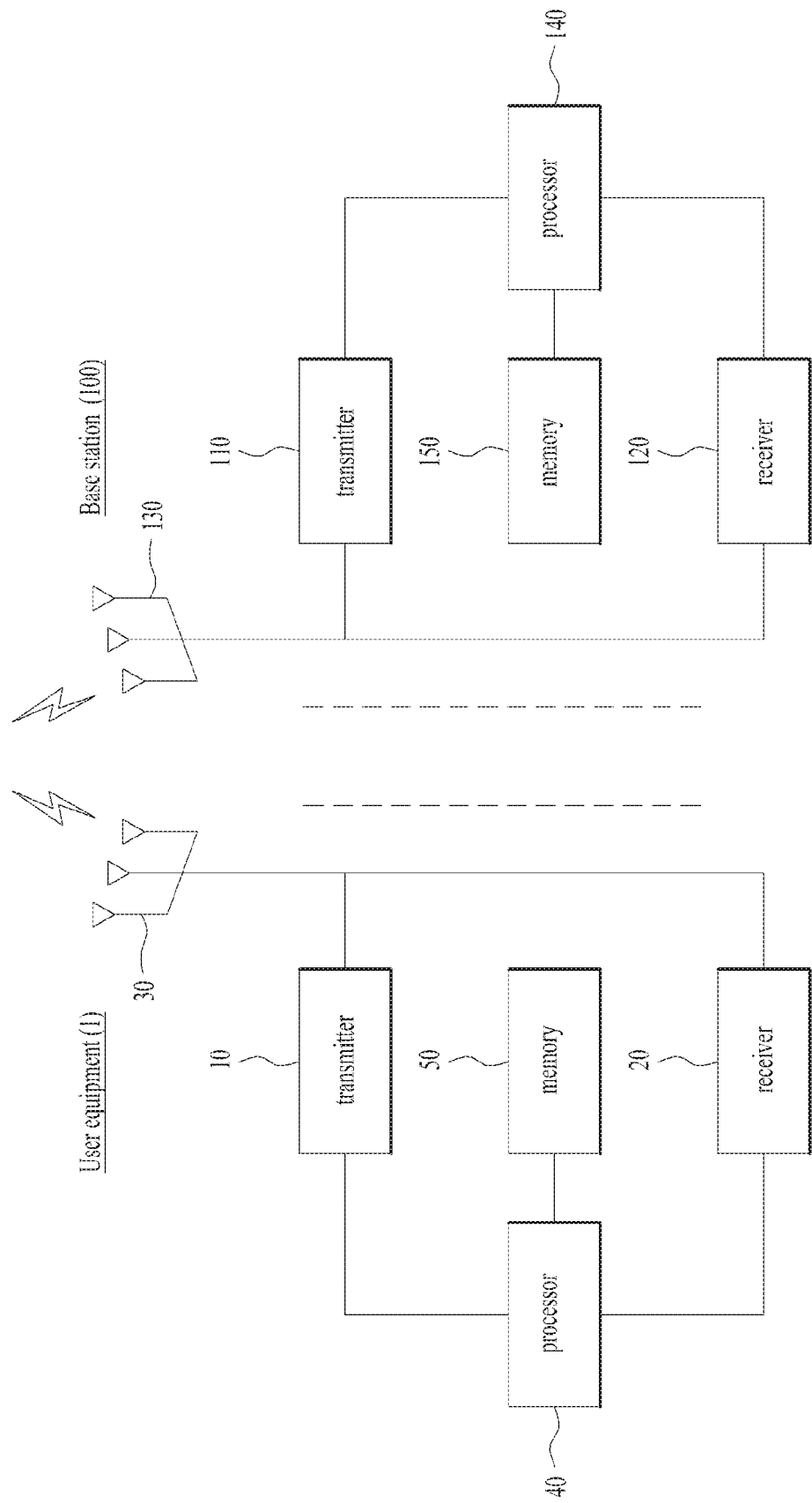
FIG. 15 is a diagram illustrating configuration of a user equipment and a base station for implementing the proposed embodiments.

FIG. 15 is a diagram illustrating configurations of a UE and a base station capable of being implemented by the embodiments proposed in the present invention. The UE and BS illustrated in FIG. 15 operate to implement the above-described embodiments of the radio link monitoring method for the UE.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the UE 1 receives, on at least one resource, at least one of a synchronization signal/physical broadcast channel (SS/PBCH) block and a channel state information reference signal (CSI-RS), each of which corresponds to the at least one resource [S1410]. In this case, the SS/PBCH block may include a primary synchronization signal (PSS), a secondary synchronization signal (SSS) and a physical broadcast channel (PBCH). Next, the UE 1 may assess radio link quality using at least one of the SS/PBCH block and CSI-RS received through the processor 40. Thereafter, the UE 1 transmits radio link state information based on the assessed radio link quality to a higher layer through the processor 40.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 15 may further include a low-power Radio Frequency (RF)/Intermediate Frequency (IF) module.

Meanwhile, the UE may be any of a Personal Digital Assistant (PDA), acellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of performing radio link monitoring (RLM) by a user equipment (UE) in a wireless communication system, the method comprising:
assessing radio link quality for each of a plurality of resources,
wherein the radio link quality for each of the plurality of resources is assessed based on a reference signal received via each of the plurality of resources; and
based on that the radio link quality for each of the plurality of resources is lower than a threshold, transmitting a signal corresponding to 'Out-of-Sync' to a higher layer,
wherein the assessing of the radio link quality for each of the plurality of resources is performed based on the threshold being a first threshold for a synchronization signal/physical broadcast channel (SS/PBCH) block, in a case that the reference signal is the SS/PBCH block,
wherein the assessing of the radio link quality for each of the plurality of resources is performed based on the threshold being a second threshold for a channel state information reference signal (CSI-RS), in a case that the reference signal is the CSI-RS, and
wherein the SS/PBCH block comprises a primary synchronization signal (PSS), a secondary synchronization signal (SSS) and a physical broadcast channel (PBCH).

2. The method of claim 1, wherein each of the plurality of resources corresponds to a beam.

3. The method of claim 1, wherein the CSI-RS received via each of the plurality of resources has a same characteristics as those of the CSI-RS for beam management (BM) related to each of the plurality of resources.

4. The method of claim 3, wherein the UE assesses the radio link quality for each of the plurality of resources based on characteristic information of the CSI-RS for the BM related to each of the plurality of resources.

5. The method of claim 1, wherein a block error rate (BLER) for a hypothetical physical downlink control channel (PDCCH) is used as a metric for assessing the radio link quality for each of the plurality of resources.

6. A user equipment (UE) for performing radio link monitoring (RLM) in a wireless communication system, the UE comprising:
a receiver; and
a processor connected to the receiver,
wherein the processor is configured to:
assess radio link quality for each of a plurality of resources,
wherein the radio link quality for each of the plurality of resources is assessed based on a reference signal received via each of the plurality of resources; and
based on that the radio link quality for each of the plurality of resources is lower than a threshold, transmit a signal corresponding to 'Out-of-Sync' to a higher layer,
wherein the assessing of the radio link quality for each of the plurality of resources is performed based on the threshold being a first threshold for a synchronization signal/physical broadcast channel (SS/PBCH) block, in a case that the reference signal is the SS/PBCH block,
wherein the assessing of the radio link quality for each of the plurality of resources is performed based on the threshold being a second threshold for a channel state information reference signal (CSI-RS), in a case that the reference signal is the CSI-RS, and
wherein the SS/PBCH block comprises a primary synchronization signal (PSS), a secondary synchronization signal (SSS) and a physical broadcast channel (PBCH).

7. The UE of claim 6, wherein each of the plurality of resources corresponds to a beam.

8. The UE of claim 6, wherein the CSI-RS received via each of the plurality of resources has a same characteristics as those of the CSI-RS for beam management (BM) related to each of the plurality of resources.

9. The UE of claim 8, wherein the UE assesses the radio link quality for each of the plurality of resources based on characteristic information of the CSI-RS for the BM related to each of the plurality of resources.

10. The UE of claim 6, wherein a block error rate (BLER) for a hypothetical physical downlink control channel (PDCCH) is used as a metric for assessing the radio link quality for each of the plurality of resources.

11. An apparatus comprising:
at least one processor; and
at least one memory operably connectable to the at least one processor and storing instructions that, when executed by the at least one processor, perform operations comprising:
assessing radio link quality for each of a plurality of resources,
wherein the radio link quality for each of the plurality of resources is assessed based on a reference signal received via each of the plurality of resources; and
based on that the radio link quality for each of the plurality of resources is lower than a threshold, transmitting a signal corresponding to 'Out-of-Sync' to a higher layer,
wherein the assessing of the radio link quality for each of the plurality of resources is performed based on the threshold being a first threshold for a synchronization signal/physical broadcast channel (SS/PBCH) block, in a case that the reference signal is the SS/PBCH block, wherein the assessing of the radio link quality for each of the plurality of resources is performed based on the threshold being a second threshold for a channel state information reference signal (CSI-RS), in a case that the reference signal is the CSI-RS, and wherein the SS/PBCH block comprises a primary synchronization signal (PSS), a secondary synchronization signal (SSS) and a physical broadcast channel (PBCH).

12. The apparatus of claim 11, wherein each of the plurality of resources corresponds to a beam.

13. The apparatus of claim 11, wherein the CSI-RS received via each of the plurality of resources has a same characteristics as those of the CSI-RS for beam management (BM) related to each of the plurality of resources.

14. The apparatus of claim 13, wherein the UE assesses the radio link quality for each of the plurality of resources based on characteristic information of the CSI-RS for the BM related to each of the plurality of resources.

15. The apparatus of claim 11, wherein a block error rate (BLER) for a hypothetical physical downlink control channel (PDCCH) is used as a metric for assessing the radio link quality for each of the plurality of resources.

* * * * *